(12) United States Patent
Donlan et al.

(10) Patent No.: US 9,037,825 B1
(45) Date of Patent: May 19, 2015

(54) WRITE HORIZON DATA MANAGEMENT

(71) Applicant: Amazon Technologies, Inc., Reno, NV (US)

(72) Inventors: Bryan James Donlan, Seattle, WA (US); Sandeep Kumar, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 175 days.

(21) Appl. No.: 13/682,501

(22) Filed: Nov. 20, 2012

(51) Int. Cl.
*G06F 12/00* (2006.01)

(52) U.S. Cl.
CPC ..................... *G06F 12/00* (2013.01)

(58) Field of Classification Search
CPC ............ G06F 3/0652; G06F 17/30371; G06F 17/30303; G06F 12/00
USPC .................................. 711/100, 163, 165–166
See application file for complete search history.

(56) References Cited

U.S. PATENT DOCUMENTS

2006/0282630 A1* 12/2006 Hochberg et al. ............. 711/160
2013/0018852 A1* 1/2013 Barton et al. ................. 707/692

* cited by examiner

*Primary Examiner* — Jasmine Song
(74) *Attorney, Agent, or Firm* — Kilpatrick Townsend & Stockton LLP

(57) ABSTRACT

Conditions are enforced to prevent unintended deletion of data stored by a data storage system. For example, to delete a collection of data, a condition on the collection of data's size may be enforced. The collection may be required to be empty, for example. In addition, a condition that there not exist a pending data processing operation that can affect fulfillment of the condition on the collection of data's size is also enforced.

26 Claims, 11 Drawing Sheets

| Name | Number of Archives | Write Horizon |
|------|-------------------|---------------|
| Name₁ | 3 | 61 |
| Name₂ | 1 | 55 |
| Name₃ | 4 | 61 |
| Name₄ | 1 | 0 |
| ⋮ | ⋮ | ⋮ |
| Nameₙ | 0 | 2 |

Generation K

| Data Object ID | Operation |
|---|---|
| ID1 | OP1 |
| ID2 | OP2 |
| ID3 | OP3 |
| ID4 | OP4 |
| ⋮ | ⋮ |
| IDN | OPN |

FIG. 7

WRITE HORIZON DATA MANAGEMENT

BACKGROUND

Modern data storage systems often employ complex processes for the purpose of increasing efficiency, lowering costs, increasing durability and/or otherwise operating beneficially. While such complexity can provide many advantages, such complexities can also cause various hazards. For example, data operations (such as reads, writes and deletes) inherently take at least some time to perform and update any records of the operations. During this time, conflicting data operations may be requested. Incorrect or inadequate processing of conflicting data requests can prove disastrous, perhaps resulting in unintended deletion of data and/or continued storage of data that was intended to be deleted. To maintain the integrity of a data storage system, therefore, great care should be taken to prevent the unintended loss of data, both due to system malfunctions and user error. Such care, however, can come at the expense of cost, efficiency and simplicity.

BRIEF DESCRIPTION OF THE DRAWINGS

Various embodiments in accordance with the present disclosure will be described with reference to the drawings, in which:

FIG. 7 illustrates an example schema for associating operations in connection with data objects with generations, in accordance with at least one embodiment;

DETAILED DESCRIPTION

Figure 1:
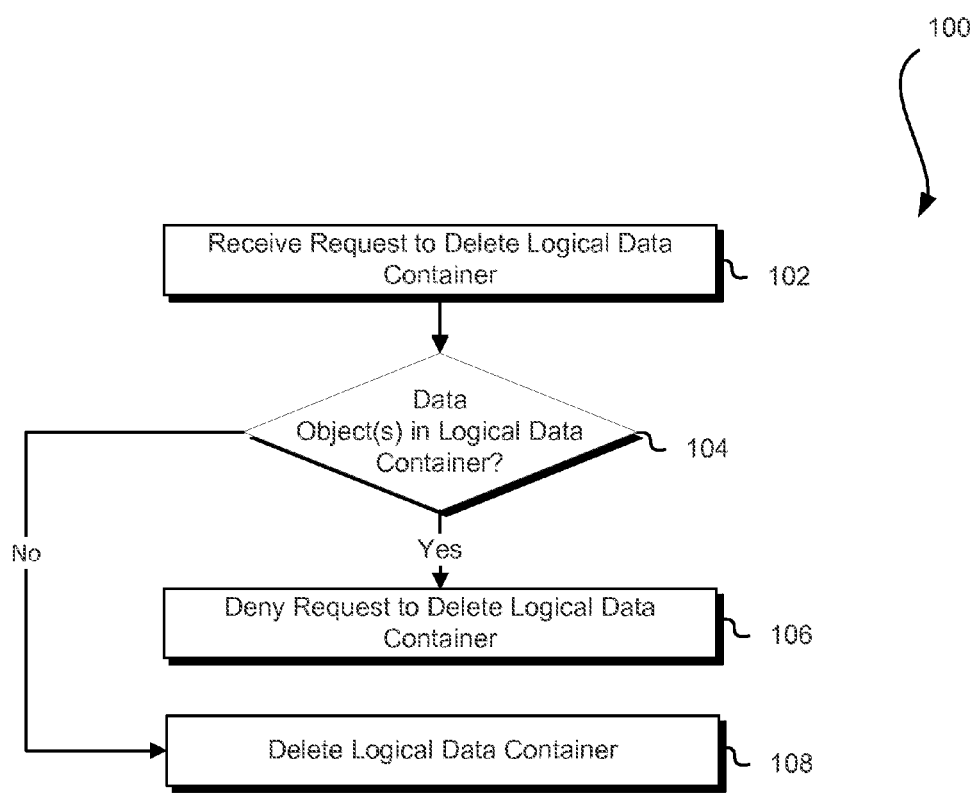
FIG. 1 illustrates an example process for enforcing conditions on data deletion, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods and systems for providing enhanced data security in data storage systems. While the present disclosure applies to various types of data storage systems, the techniques described herein are especially useful when used in connection with archival data storage systems that allow customers and/or other users of the system to store, retrieve and delete archival data objects as well as perform metadata and configuration operations using a programmatic user interface. While various embodiments are described in connection with customers, the techniques described are applicable to data storage systems not necessarily used to provide services to others. For example, many techniques are applicable to internal data storage systems used by organizations.

In an embodiment, an archival data storage service operates such that, from the perspective of users of the service (either human users or automated users), data storage and deletion operations appear to be handled in a synchronous fashion while data retrieval and certain metadata operations appear to take longer time to complete. When a customer requests that a data object be stored in an archival data storage system, the data object is stored in a transient data store until the data object can be moved to a more durable data storage that is less expensive to maintain. The process of moving the data object from transient to archival storage may take a relatively long time, in some embodiments, on the order of hours. Similarly, retrieval, deletion, metadata-related operations and/or other operations from archival data storage can take similar amounts of time.

In an embodiment, the archival data storage system comprises a front end subsystem that handles customer requests and performs functionalities such as authentication, authorization, usage metering, accounting and billing, and the like. Additionally, the front end subsystem may also handle bulk data transfers in and out of the archival data storage system. The front end subsystem may, as described in more detail below, enforce certain conditions to enhance data security, such as be enforcing conditions intended to prevent the unintended deletion of data by customers. For example, the front end subsystem may enforce conditions that are configured to reduce the likelihood that a customer submits a mistaken request to delete data that was not intended by the customer for deletion.

In an embodiment, the archival data storage system comprises a metadata plane subsystem (sometimes referred to simply as a "metadata plane") that provides information about data objects stored in the system for inventory and accounting purposes, customer metadata inquiries, anti-entropy processing and the like. In particular, metadata plane may generate a cold index (i.e., an index that is updated infrequently) based on job completion records. Metadata plane services may be designed to impose minimal cost overhead using techniques such as batch processing. In various embodiments, the metadata plane processes job completion records in batches. The completion of a batch may correspond to a generation and completed batches may, accordingly, be recorded using a generational counter. The actual state of a data object (and/or a logical data container for the object, described below) may differ from a state recorded in metadata of the archival data storage system, such as when a data processing request that would affect the object's state as reflected in the metadata has not been processed by the metadata plane. As a specific example, if a user uploads a data object to a logical data container, metadata for the logical data container (e.g., indicating how many objects are contained in the logical data container) may not reflect the upload until the upload completion, including moving the data object into archival data storage, is processed by the metadata plane. In other words, accuracy of metadata for a logical data container may lag operations performed in connection with the logical data container.

In various embodiments, various conditions are enforced to prevent the unintended deletion of data. For example, as noted above, data objects may be organized according to logical data containers. To prevent against unintended data loss, a data storage system may enforce a condition on a size of a logical data container for the logical data container to be deleted. Size may be measured in various ways. In various embodiments, the size of a logical data container is measured by the number of data objects in the logical data container. The data objects, in various embodiments, need not have uniform size (i.e., may contain varying amounts of data). The size of a logical data container, however, may be measured in other ways, such as by the amount of data (e.g., measured in bytes) contained in the logical data container. While various embodiments of the present disclosure illustrate embodiments in terms of numbers of data objects, it should be noted that the described techniques may be adapted to utilize other measurements of size. The condition on size may also vary among the various embodiments. For example, the condition on size may be that a logical data container be empty (e.g., contains zero data objects or zero bytes) before it is deleted, although other sizes other than zero may be used. In addition, to prevent unintended deletion of data, a data storage system may require that any data objects of a logical data container be deleted explicitly by request before the logical data container is deleted. In this manner, deletion of a large amount of data by simply naming a logical data container is prevented, thereby avoiding unintended data loss, such as by specifying the incorrect logical data container in the request.

To enforce the condition on the size of the logical data container, a front end system of the data storage system may maintain (or otherwise have access to) a database that associates logical data containers with numbers of objects in the logical data containers. However, as noted above, metadata about logical data containers may not be current for a period of time. For example, immediately after a request to upload a data object to a logical data container, a front end database may associate the logical data container with a number of data objects that does not take into account the uploaded data object. The from end database may remain inaccurate until a metadata subsystem provides information to the front end subsystem indicating that the data object was successfully uploaded, although this information itself may be inaccurate if, for instance, additional upload requests for the logical data container are still pending. Similarly, immediately after a request to delete a data object form the logical data container for a period of time, the front end database may associate the logical data container with a number of data objects that does not take into account the deletion. In other words, pending data processing requests (e.g., jobs that have not been recorded by the metadata plane) have the potential to affect whether the condition of the logical data container be empty and is properly enforced. It should be noted that, while logical data containers and data object contained by the logical data containers are used for the purpose of illustration, techniques described and suggested herein are applicable to collections of data in general.

Accordingly, techniques of the present disclosure enhance data security by enforcing conditions that take into account the above potential inaccuracies. In various embodiments, a condition for deleting a logical data container requires there to be no possibility of a pending data processing request that, when completed, affect whether the condition on size can be accurately enforced. For example, such a condition may be that a number of data objects contained by the logical data container, as reflected in a front end database, be accurate. Enforcing this condition may be performed in various ways. In various embodiments, a value (referred to as a write horizon or write horizon value) is maintained so as to be indicative of whether there exists the possibility of a pending data processing request affecting the size of the data object.

In an embodiment, when a request that may affect the size of a logical data container is requested (such as a request to upload a data object to the logical data container), the write horizon is updated to be at least the value of a current generation of a data storage system, which may be a value of a current generation as determined by a metadata subsystem. The write horizon may be updated to be the value of the current generation, for example. Thus, the write horizon being equal to or greater than the current generation indicates that there may be a pending data processing request (e.g., upload of a data object to archival storage) that can affect the size of the logical data container. Once the current generation (or one or more future generations) is processed, the write horizon may eventually be less than or equal to a last processed generation. For instance, in some embodiments, if the write horizon is updated to 62 (the current generation) upon receipt of the request, and if no additional such requests are received, the write horizon value of 62 will be equal to the last processed generation once the current generation processes and updates caused by the current generation having been processed are committed to a database in a front end system that handles requests. It should be noted that, because of the complexity of various data storage systems and/or the redundancies of certain components in data storage systems, the last processed generation for a logical data container may not simply be the integer preceding the current generation, but may be less. In this manner, the value of the write horizon relative to the current generation serves as an indication of the potential for (i.e., possible existence of) pending requests to affect the size of the logical data container.

When a request to delete a logical data container is received, in addition to checking whether the logical data container is indicated to be empty, the value of the write horizon relative to a last processed may be checked. For example, in various embodiments, if the write horizon is greater than the last processed generation, the request to delete the logical data container may be denied. Denial may be permanent such that a new request is required to delete the logical data container. Denial may, in some embodiments, be temporary at least temporarily until the conditions for deleting the logical data container are fulfilled or until other conditions (e.g. expiration of a timer) result in the denial being permanent.

As noted, various embodiments of the present disclosure relate to prevent unintended deletion of data in a data storage system. FIG. 1 shows an illustrative example of a process for maintaining data integrity by enforcing constraints of a data storage system, in accordance with various embodiments. As illustrated, the process 100 includes receiving a request to delete a logical data container. The request may be received in any suitable manner. In an embodiment, the request is received over one or more communications networks as an application programming interface (API) call from a computing device of a customer of a data storage system. The data storage system may be an archival data storage system, such as described below, or any data storage system that organizes data objects by logical data containers. Further, while illustrated as a request to delete a single logical data container, the process 100 may be modified, for example, to handle requests to delete multiple different logical data containers.

As part of enforcing constraints of a data storage system to prevent unintended deletion, the process 100 includes determining 104 whether there are any objects in the logical data container requested to be deleted. A data store that associates logical data containers with information about the logical data containers may be used to make the determination 104. If it is determined 104 that the logical data container contains one or more data objects, that is, as a result of determining that the logical data container is not empty, the request to delete the logical data container may be denied 106. Denying the request may be performed in any suitable manner, such us by providing a response to the request that indicates the denial or by simply not performing the requested deletion. However, if it is determined that there are no data objects in the logical data container, that is, as a result of determining that the logical data container is empty, the logical data container may be deleted 108. In this manner, performance of the process 100 ensures that only empty logical data containers can be deleted.

As with all processes described herein, variations are considered as being within the scope of the present disclosure. For example, operations performed by a system performing a process described herein may be omitted from the illustration and/or description for the purpose of avoiding obfuscation of certain details. For instance, the process 100 may include additional operations, such as authenticating the request and proceeding according to whether the request is authenticated. Further, operations illustrated and described may include one or more sub-processes. For example, in some data storage systems, deletion may be an asynchronous process having its own complexities, some of which are described in more detail below.

Figure 2:
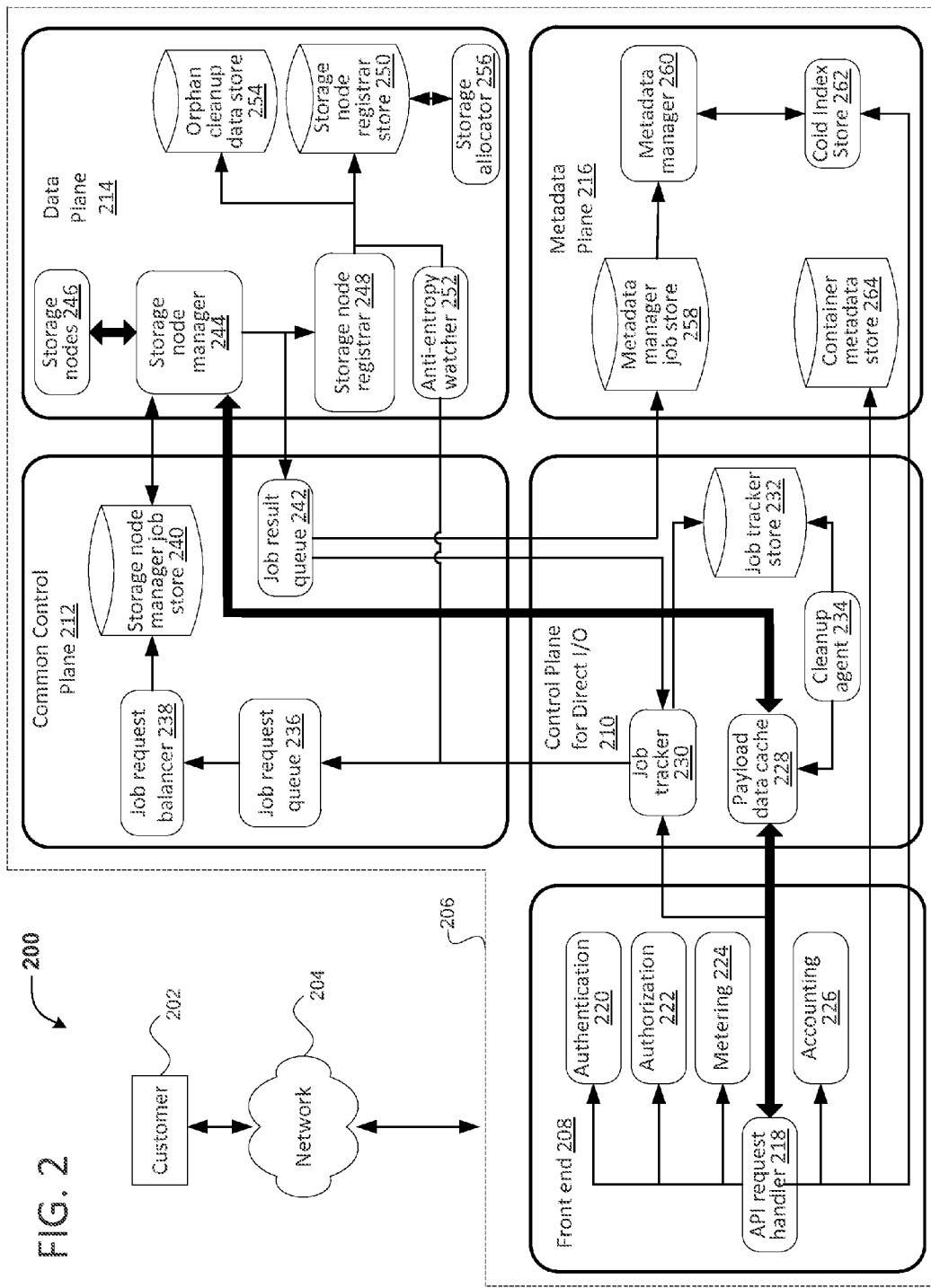
FIG. 2 illustrates an example environment in which various embodiments may be implemented.

FIG. 2 illustrates an example environment 200 in which an archival data storage system may be implemented, in accordance with one embodiment. One or more customers 202 connect, via a network 204, to an archival data storage system 206. As implied above, unless otherwise clear from context, the term "customer" refers to the system(s) of a customer entity (such as an individual, company or other organization) that utilizes data storage services described herein. Such systems may include datacenters, mainframes, individual computing devices, distributed computing environments and customer-accessible instances thereof or any other system capable of communicating with the archival data storage system. In some embodiments, a customer may refer to a machine instance (e.g., with direct hardware access) or virtual instance of a distributed computing system provided by a computing resource provider that also provides the archival data storage system. In some embodiments, the archival data storage system is integral to the distributed computing system and may include or be implemented by an instance, virtual or machine, of the distributed computing system. In various embodiments, network 204 may include the Internet, a local area network ("LAN"), a wide area network ("WAN"), a cellular data network and/or other data network.

In an embodiment, archival data storage system 206 provides a multi-tenant or multi-customer environment where each tenant or customer may store, retrieve, delete or otherwise manage data in a data storage space allocated to the customer. In some embodiments, an archival data storage system 206 comprises multiple subsystems or "planes" that each provides a particular set of services or functionalities. For example, as illustrated in FIG. 2, archival data storage system 206 includes front end 208, control plane for direct I/O 210, common control plane 212, data plane 214 and metadata plane 216. Each subsystem or plane may comprise one or more components that collectively provide the particular set of functionalities. Each component may be implemented by one or more physical and/or logical computing devices, such as computers, data storage devices and the like. Components within each subsystem may communicate with components within the same subsystem, components in other subsystems or external entities such as customers. At least some of such interactions are indicated by arrows in FIG. 2. In particular, the main bulk data transfer paths in and out of archival data storage system 206 are denoted by bold arrows. It will be appreciated by those of ordinary skill in the art that various embodiments may have fewer or a greater number of systems, subsystems and/or subcomponents than are illustrated in FIG. 2. Thus, the depiction of environment 200 in FIG. 2 should be taken as being illustrative in nature and not limiting to the scope of the disclosure.

In the illustrative embodiment, front end 208 implements a group of services that provides an interface between the archival data storage system 206 and external entities, such as one or more customers 202 described herein. In various embodiments, front end 208 provides an application programming interface ("API") to enable a user to programmatically interface with the various features, components and capabilities of the archival data storage system. Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof.

Capabilities provided by archival data storage system 206 may include data storage, data retrieval, data deletion, metadata operations, configuration of various operational parameters and the like. Metadata operations may include requests to retrieve catalogs of data stored for a particular customer, data recovery requests, job inquires and the like. Configuration APIs may allow customers to configure account information, audit logs, policies, notifications settings and the like. A customer may request the performance of any of the above operations by sending API requests to the archival data storage system. Similarly, the archival data storage system may provide responses to customer requests. Such requests and responses may be submitted over any suitable communications protocol, such as Hypertext Transfer Protocol ("HTTP"), File Transfer Protocol ("FTP") and the like, in any suitable format, such as REpresentational State Transfer ("REST"), Simple Object Access Protocol ("SOAP") and the like. The requests and responses may be encoded, for example, using Base64 encoding, encrypted with a cryptographic key or the like.

In some embodiments, archival data storage system 206 allows customers to create one or more logical structures such as a logical data containers in which to store one or more archival data objects. Typically, such logical data structures may be created to meeting certain business requirements of the customers and are independently of the physical organization of data stored in the archival data storage system. As used herein, the term "logical data container" refers to a grouping of data objects. For example, data objects created for a specific purpose or during a specific period of time may be stored in the same logical data container. Each logical data container may include nested data containers or data objects and may be associated with a set of policies such as size limit of the container, maximum number of data objects that may be stored in the container, expiration data, access control list and the like. In various embodiments, logical data containers may be created, deleted or otherwise modified by customers via API requests, by a system administrator or by the data storage system, for example, based on configurable information. For example, the following HTTP PUT request may be used, in an embodiment, to create a logical data container with name "logical-container-name" associated with a customer identified by an account identifier "accountId".

PUT/{accountId}/logical-container-name HTTP/1.1

In an embodiment, archival data storage system 206 provides the APIs for customers to store data objects into logical data containers. For example, the following HTTP POST request may be used, in an illustrative embodiment, to store a data object into a given logical container. In an embodiment, the request may specify the logical path of the storage location, data length, reference to the data payload, a digital digest of the data payload and other information. In one embodiment, the APIs may allow a customer to upload multiple data objects to one or more logical data containers in one request. In another embodiment where the data object is large, the APIs may allow a customer to upload the data object in multiple parts, each with a portion of the data object.

POST/{accountId}/logical-container-name/data HTTP/1.1
Content-Length: 1128192
x-ABC-data-description: "annual-result-2012.xls"
x-ABC-md5-tree-hash: 634d9a0688aff95c In response to a data storage request, in an embodiment, archival data storage system 206 provides a data object identifier if the data object is stored successfully. Such data object identifier may be used to retrieve, delete or otherwise refer to the stored data object in subsequent requests. In some embodiments, such as data object identifier may be "self-describing" in that it encodes (for example, by encryption) storage location information that may be used by the archival data storage system to locate the data object without the need for a additional data structures such as a global namespace key map. In addition, in some embodiments, data object identifiers may also encode other information such as payload digest, error-detection code, access control data and the other information that may be used to validate subsequent requests and data integrity. In some embodiments, the archival data storage system stored incoming data in a transient durable data store before moving it archival data storage. Thus, although customers may perceive that data is persisted durably at the moment when an upload request is completed, actual storage to a long-term persisted data store may not commence until some time later (e.g., 12 hours later). In some embodiments, the timing of the actual storage may depend on the size of the data object, the system load during a diurnal cycle, configurable information such as a service-level agreement between a customer and a storage service provider and other factors.

In some embodiments, archival data storage system 206 provides the APIs for customers to retrieve data stored in the archival data storage system. In such embodiments, a customer may initiate a job to perform the data retrieval and may learn the completion of the job by a notification or by polling the system for the status of the job. As used herein, a "job" refers to a data-related activity corresponding to a customer request that may be performed temporally independently from the time the request is received. For example, a job may include retrieving, storing and deleting data, retrieving metadata and the like. A job may be identified by a job identifier that may be unique, for example, among all the jobs for a particular customer. For example, the following HTTP POST request may be used, in an illustrative embodiment, to initiate a job to retrieve a data object identified by a data object identifier "dataObjectId." In other embodiments, a data retrieval request may request the retrieval of multiple data objects, data objects associated with a logical data container and the like.

POST/{accountId}/logical-data-container-name/data/{dataObjectId}HTTP/1.1 in response to the request, in an embodiment, archival data storage system 206 provides a job identifier job-id," that is assigned to the job in the following response. The response provides, in this example, a path to the storage location where the retrieved data will be stored.

HTTP/1.1 202 ACCEPTED
Location:/{accountId}/logical-data-container-name/jobs/{job-id}

At any given point in time, the archival data storage system may have many jobs pending for various data operations. In some embodiments, the archival data storage system may employ job planning and optimization techniques such as batch processing, load balancing, job coalescence and the like, to optimize system metrics such as cost, performance, scalability and the like. In some embodiments, the timing of the actual data retrieval depends on factors such as the size of the retrieved data, the system load and capacity, active status of storage devices and the like. For example, in some embodiments, at least some data storage devices in an archival data storage system may be activated or inactivated according to a power management schedule, for example, to reduce operational costs. Thus, retrieval of data stored in a currently active storage device (such as a rotating hard drive) may be faster than retrieval of data stored in a currently inactive storage device (such as a spinned-down hard drive).

In an embodiment, when a data retrieval job is completed, the retrieved data is stored in a staging data store and made available for customer download. In some embodiments, a customer is notified of the change in status of a job by a configurable notification service. In other embodiments, a customer may learn of the status of a job by polling the system using a job identifier. The following HTTP GET request may be used, in an embodiment, to download data that is retrieved by a job identified by "job-id," using a download path that has been previously provided.

GET/{accountId}/logical-data-container-name/jobs/{job-id}/output HTTP/1.1

In response to the GET request, in an illustrative embodiment, archival data storage system 206 may provide the retrieved data in the following HTTP response, with a tree-hash of the data for verification purposes.

HTTP/1.1 200 OK
Content-Length: 1128192
x-ABC-archive-description: "retrieved stuff"
x-ABC-md5-tree-hash: 693d9a7838aff95c
[1112192 bytes of user data follows]

In an embodiment, a customer may request the deletion of a data object stored in an archival data storage system by specifying a data object identifier associated with the data object. For example, in an illustrative embodiment, a data object with data object identifier "dataObjectId" may be deleted using the following HTTP request. In another embodiment, a customer may request the deletion of multiple data objects such as those associated with a particular logical data container.

DELETE/{accountId}/logical-data-container-name/data/{dataObjectId}HTTP/1.1

In various embodiments, data objects may be deleted in response to a customer request or may be deleted automatically according to a user-specified or default expiration date. In some embodiments, data objects may be rendered inaccessible to customers upon an expiration time but remain recoverable during a grace period beyond the expiration time. In various embodiments, the grace period may be based on configurable information such as customer configuration, service-level agreement terms and the like. In some embodiments, a customer may be provided the abilities to query or receive notifications for pending data deletions and/or cancel one or more of the pending data deletions. For example, in one embodiment, a customer may set up notification configurations associated with a logical data container such that the customer will receive notifications of certain events pertinent to the logical data container. Such events may include the completion of a data retrieval job request, the completion of metadata request, deletion of data objects or logical data containers and the like.

In an embodiment, archival data storage system 206 also provides metadata APIs for retrieving and managing metadata such as metadata associated with logical data containers. In various embodiments, such requests may be handled asynchronously (where results are returned later) or synchronously (where results are returned immediately).

Still referring to FIG. 2, in an embodiment, at least some of the API requests discussed above are handled by API request handler 218 as part of front end 208. For example, API request handler 218 may decode and/or parse an incoming API request to extract information, such as uniform resource identifier ("URI"), requested action and associated parameters, identity information, data object identifiers and the like. In addition, API request handler 218 invoke other services (described below), where necessary, to further process the API request.

In an embodiment, front end 208 includes an authentication service 220 that may be invoked, for example, by API handler 218, to authenticate an API request. For example, in some embodiments, authentication service 220 may verify identity information submitted with the API request such as username and password Internet Protocol ("IP") address, cookies, digital certificate, digital signature and the like. In other embodiments, authentication service 220 may require the customer to provide additional information or perform additional steps to authenticate the request, such as required in a multifactor authentication scheme, under a challenge-response authentication protocol and the like.

In an embodiment, front end 208 includes an authorization service 222 that may be invoked, for example, by API handler 218, to determine whether a requested access is permitted according to one or more policies determined to be relevant to the request. For example, in one embodiment, authorization service 222 verifies that a requested access is directed to data objects contained in the requestor's own logical data containers or which the requester is otherwise authorized to access. In some embodiments, authorization service 222 or other services of front end 208 may check the validity and integrity of a data request based at least in part on information encoded in the request, such as validation information encoded by a data object identifier.

In an embodiment, front end 208 includes a metering service 224 that monitors service usage information for each customer such as data storage space used, number of data objects stored, data requests processed and the like. In an embodiment, front end 208 also includes accounting service 226 that performs accounting and billing-related functionalities based, for example, on the metering information collected by the metering service 224, customer account information and the like. For example, a customer may be charged a fee based on the storage space used by the customer, size and number of the data objects, types and number of requests submitted, customer account type, service level agreement the like.

In an embodiment, front end 208 batch processes some or all incoming requests. For example, from end 208 may wait until a certain number of requests has been received before processing (e.g., authentication, authorization, accounting and the like) the requests. Such a number may be based on configurable information and/or dynamically obtained information such as system load, customer requests and the like.

In some embodiments, front end 208 may invoke services provided by other subsystems of the archival data storage system to further process an API request. For example, front end 208 may invoke services in metadata plane 216 to fulfill metadata requests. For another example, front end 208 may stream data in and out of control plane for direct I/O 210 for data storage and retrieval requests, respectively.

Referring now to control plane for direct I/O 210 illustrated in FIG. 2, in various embodiments, control plane for direct I/O 210 provides services that create, track and manage jobs created as a result of customer requests. As discussed above, a job refers to a customer-initialed activity that may be performed asynchronously to the initialing request, such as data retrieval, storage, metadata queries or the like. In an embodiment, control plane for direct I/O 210 includes a job tracker 230 that is configured to create job records or entries corresponding to customer requests, such as those received from API request handler 218, and monitor the execution of the jobs. In various embodiments, a job record may include information related to the execution of a job such as a customer account identifier, job identifier, data object identifier, reference to payload data cache 228 (described below), job status, data validation information and the like. In some embodiments, job tracker 230 may collect information necessary to construct a job record from multiple requests. For example, when a large amount of data is requested to be stored, data upload may be broken into multiple requests, each uploading a portion of the data. In such a case, job tracker 230 may maintain information to keep track of the upload status to ensure that all data parts have been received before a job record is created. In some embodiments, job tracker 230 also obtains a data object identifier associated with the data to be stored and provides the data object identifier, for example, to a front end service to be returned to a customer. In an embodiment, such data object identifier may be obtained from data plane 214 services such as storage node manager 244, storage node registrar 248, and the like, described below.

In some embodiments, control plane for direct I/O 210 includes a job tracker store 232 for storing job entries or records. In various embodiments, job tracker store 230 may be implemented by a NoSQL data management system, such as a key-value data store, a relational database management system ("RDBMS") or any other data storage system. In some embodiment, data stored in job tracker store 230 may be partitioned to enable fast enumeration of jobs that belong to a specific customer, facilitate efficient bulk record deletion, parallel processing by separate instances of a service and the like. For example, job tracker store 230 may implement tables that are partitioned according in customer account identifiers and that use job identifiers as range keys. In an embodiment, job tracker store 230 is further sub-partitioned based on time (such as job expiration time) to facilitate job expiration and cleanup operations. In an embodiment, transactions against job tracker store 232 may be aggregated to reduce the total number of transactions. For example, in some embodiments, a job tracker 230 may perform aggregate multiple jobs corresponding to multiple requests into one single aggregated job before insetting it into job tracker store 232.

In an embodiment, job tracker 230 is configured to submit the job for further job scheduling and planning, for example, by services in common control plane 212. Additionally, job tracker 230 may be configured to monitor the execution of jobs and update corresponding job records in job tracker store 232 as jobs are completed. In some embodiments, job tracker 230 may be further configured to handle customer queries such as job status queries. In some embodiments, job tracker 230 also provides notifications of job status changes to customers or other services of the archival data storage system. For example, when a data retrieval job is completed, job tracker 230 may cause a customer to be notified (for example, using a notification service) that data is available for download. As another example, when a data storage job is completed, job tracker 230 may notify a cleanup agent 234 to remove payload data associated with the data storage job from a transient payload data cache 228, described below.

In an embodiment, control plane for direct I/O 210 includes a payload data cache 228 for providing transient data storage services for payload data transiting between data plane 214 and front end 208. Such data includes incoming data pending storage and outgoing data pending customer download. In one embodiment, data storage services provided for incoming and outgoing data may be differentiated. For example, data storage for the incoming data, which is not yet persisted in archival data storage, may provide higher reliability and durability than data storage for outgoing (retrieved) data, which is already persisted in archival data storage. In another embodiment, transient storage may be optional for incoming data, that is, incoming data may be stored directly in archival data storage without being stored in a transient data storage such as payload data cache 228, for example, when there is the system has sufficient bandwidth and/or capacity to do so.

In an embodiment, control plane for direct I/O 210 also includes a cleanup agent 234 that monitors job tracker store 232 and/or payload data cache 228 and removes data that is no longer needed. For example, payload data associated with a data storage request may be safely removed from payload data cache 228 after the data is persisted in permanent storage (e.g., data plane 214). On the reverse path, data staged for customer download may be removed from payload data cache 228 after a configurable period of time (e.g., 30 days since the data is staged) or after a customer indicates that the staged data is no longer needed.

In some embodiments, cleanup agent 234 removes a job record from job tracker store 232 when the job status indicates that the job is complete or aborted. As discussed above, in some embodiments, job tracker store 232 may be partitioned to enable to enable faster cleanup. In one embodiment where data is partitioned by customer account identifiers, cleanup agent 234 may remove an entire table that stores jobs for a particular customer account when the jobs are completed instead of deleting individual jobs one at a time. In another embodiment where data is further sub-partitioned based on job expiration time cleanup agent 234 may bulk-delete a whole partition or table of jobs after all the jobs in the partition expire. In other embodiments, cleanup agent 234 may receive instructions or control messages (such as indication that jobs are completed) from other services such as job tracker 230 that cause the cleanup agent 234 to remove job records from job tracker store 232 and/or payload data cache 228.

Referring now to common control plane 212 illustrated in FIG. 2. In various embodiments, common control plane 212 provides a queue-based load leveling service to dampen peak to average load levels (jobs) coming from control plane for I/O 210 and to deliver manageable workload to data plane 214. In an embodiment, common control plane 212 includes a job request queue 236 for receiving jobs created by job tracker 230 in control plane for direct I/O 210, described above, a storage node manager job store 240 from which services from data plane 214 (e.g., storage node managers 244) pick up work to execute and a request balancer 238 for transferring job items from job request queue 236 to storage node manager job store 240 in an intelligent manner.

In an embodiment, job request queue 236 provides a service for inserting items into and removing items from a queue (e.g., first-in-first-out (FIFO) or first-in-last-out (FILO)), a set or any other suitable data structure. Job entries in the job request queue 236 may be similar to or different from job records stored in job tracker store 232, described above.

In an embodiment, common control plane 212 also provides a durable high efficiency job store, storage node manager job store 240, that allows services from data plane 214 (e.g., storage node manager 244, anti-entropy watcher 252) to perform job planning optimization, check pointing and recovery. For example, in an embodiment, storage node manager job store 240 allows the job optimization such as batch processing, operation coalescing and the like by supporting scanning, querying, sorting or otherwise manipulating and managing job items stored in storage node manager job store 240. In an embodiment, a storage node manager 244 scans incoming jobs and sort the jobs by the type of data operation (e.g., read, write or delete), storage locations (e.g., volume, disk), customer account identifier and the like. The storage node manager 244 may then reorder, coalesce, group in batches or otherwise manipulate and schedule the jobs for processing. For example, in one embodiment, the storage node manager 244 may batch process all the write operations before all the read and delete operations. In another embodiment, the storage node manager 244 may perform operation coalescing. For another example, the storage node manager 244 may coalesce multiple retrieval jobs for the same object into one job or cancel a storage job and a deletion job for the same data object where the deletion job comes after the storage job.

In an embodiment, storage node manager job store 240 is partitioned, for example, based on job identifiers, so as to allow independent processing of multiple storage node managers 244 and to provide even distribution of the incoming workload to all participating storage node managers 244. In various embodiments, storage node manager job store 240 may be implemented by a NoSQL data management system, such as a key-value data store, a RDBMS or any other data storage system.

In an embodiment, request balancer 238 provides a service for transferring job items from job request queue 236 to storage node manager job store 240 so as to smooth out variation in workload and to increase system availability. For example, request balancer 238 may transfer job items from job request queue 236 at a lower rate or at a smaller granularity when there is a surge in job requests coming into the job request queue 236 and vice versa when there is a lull in incoming job requests so as to maintain a relatively sustainable level of workload in the storage node manager store 240. In some embodiments, such sustainable level of workload is around the same or below the average workload of the system.

In an embodiment, job items that are completed are removed from storage node manager job store 240 and added to the job result queue 242. In an embodiment, data plane 214 services (e.g., storage node manager 244) are responsible for removing the job items from the storage node manager job store 240 and adding them to job result queue 242. In some embodiments, job request queue 242 is implemented in a similar manner as job request queue 235, discussed above.

Referring now to data plane 214 illustrated in FIG. 2. In various embodiments, data plane 214 provides services related to long-term archival data storage, retrieval and deletion, data management and placement, anti-entropy operations and the like. In various embodiments, data plane 214 may include any number and type of storage entities such as data storage devices (such as tape drives, hard disk drives, solid state devices, and the like), storage nodes or servers, datacenters and the like. Such storage entities may be physical, virtual or any abstraction thereof (e.g., instances of distributed storage and/or computing systems) and may be organized into any topology, including hierarchical or tiered topologies. Similarly, the components of the data plane may be dispersed, local or any combination thereof. For example, various computing or storage components may be local or remote to any number of datacenters, servers or data storage devices, which in turn may be local or remote relative to one another. In various embodiments, physical storage entities may be designed for minimizing power and cooling costs by controlling the portions of physical hardware that are active (e.g., the number of hard drives that are actively rotating). In an embodiment, physical storage entities implement techniques, such as Shingled Magnetic Recording (SMR), to increase storage capacity.

In an environment illustrated by FIG. 2, one or more storage node managers 244 each controls one or more storage nodes 246 by sending and receiving data and control messages. Each storage node 246 in turn controls a (potentially large) collection of data storage devices such as hard disk drives. In various embodiments, a storage node manager 244 may communicate with one or more storage nodes 246 and a storage node 246 may communicate with one or more storage node managers 244. In an embodiment, storage node managers 244 are implemented by one or more computing devices that are capable of performing relatively complex computations such as digest computation, data encoding and decoding, job planning and optimization and the like. In some embodiments, storage nodes 244 are implemented by one or more computing devices with less powerful computation capabilities than storage node managers 244.

In an embodiment, a storage node manager 244 serves as an entry point for jobs coming into and out of data plane 214 by picking job items from common control plane 212 (e.g., storage node manager job store 240), retrieving staged data from payload data cache 228 and performing necessary data encoding for data storage jobs and requesting appropriate storage nodes 246 to store, retrieve or delete data. Once the storage nodes 246 finish performing the requested data operations, the storage node manager 244 may perform additional processing, such as data decoding and storing retrieved data in payload data cache 228 for data retrieval jobs, and update job records in common control plane 212 (e.g., removing finished jobs from storage node manager job store 240 and adding them to job result queue 242).

In an embodiment, storage node manager 244 performs data encoding according to one or more data encoding schemes before data storage to provide data redundancy, security and the like. Such data encoding schemes may include encryption schemes, redundancy encoding schemes such as erasure encoding and redundant array of independent disks (RAID) encoding schemes and the like. Likewise, in an embodiment, storage node managers 244 performs corresponding data decoding schemes, such as decryption, erasure-decoding and the like, after data retrieval to restore the original data.

As discussed above in connection with storage node manager job store 240, storage node managers 244 may implement job planning and optimizations such as batch processing, operation coalescing and the like to increase efficiency. In some embodiments, jobs are partitioned among storage node managers so that there is little or no overlap between the partitions. Such embodiments facilitate parallel processing by multiple storage node managers, for example, by reducing the probability of racing or locking.

In various embodiments, data plane 214 is implemented to facilitate data integrity. For example, storage entities handling bulk data flows such as storage nodes managers 244 and/or storage nodes 246 may validate the digest of data stored or retrieved, check the error-detection code to ensure integrity of metadata and the like.

In various embodiments, data plane 214 is implemented to facilitate scalability and reliability of the archival data storage system. For example, in one embodiment, storage node managers 244 maintain no or little internal state so that they can be added, removed or replaced with little adverse impact. In one embodiment, each storage device is a self-contained and self-describing storage unit capable of providing information about data stored thereon. Such information may be used to facilitate data recovery in case of data loss. Furthermore, in one embodiment, each storage node 246 is capable of collecting and reporting information about the storage node including the network location of the storage node and storage information of connected storage devices to one or more storage node registrars 248 and/or storage node registrar stores 250. In some embodiments, storage nodes 246 perform such self-reporting at system start up time and periodically provide updated information. In various embodiments, such a self-reporting approach provides dynamic and up-to-date directory information without the need to maintain a global namespace key map or index which can grow substantially as large amounts of data objects are stored in the archival data system.

In an embodiment, data plane 214 may also include one or more storage node registrars 248 that provide directory information for storage entities and data stored thereon, data placement services and the like. Storage node registrars 248 may communicate with and act as a front end service to one or more storage node registrar stores 250, which provide storage for the storage node registrars 248. In various embodiments, storage node registrar store 250 may be implemented by a NoSQL data management system, such as a key-value data store, a RDBMS or any other data storage system. In some embodiments, storage node registrar stores 250 may be partitioned to enable parallel processing by multiple instances of services. As discussed above, in an embodiment, information stored at storage node registrar store 250 is based at least partially on information reported by storage nodes 246 themselves.

In some embodiments, storage node registrars 248 provide directory service, for example, to storage node managers 244 that want to determine which storage nodes 246 to contact for data storage, retrieval and deletion operations. For example, given a volume identifier provided by a storage node manager 244, storage node registrars 248 may provide, based on a mapping maintained in a storage node registrar store 250, a list of storage nodes that host volume components corresponding to the volume identifier. Specifically, in one embodiment, storage node registrar store 250 stores a mapping between a list of identifiers of volumes or volume components and endpoints, such as Domain Name System (DNS) names, of storage nodes that host the volumes or volume components.

As used herein, a "volume" refers to a logical storage space within a data storage system in which data objects may be stored. A volume may be identified by a volume identifier. A volume may reside in one physical storage device (e.g., a hard disk) or span across multiple storage devices. In the latter case, a volume comprises a plurality of volume components each residing on a different storage device. As used herein, a "volume component" refers a portion of a volume that is physically stored in a storage entity such as a storage device. Volume components for the same volume may be stored on different storage entities. In one embodiment, when data is encoded by a redundancy encoding scheme (e.g., erasure coding), each encoded data component or "shard" may be stored in a different volume component to provide fault tolerance and isolation. In some embodiments, a volume component is identified by a volume component identifier that includes a volume identifier and a shard slot identifier. As used herein, a shard slot identifies a particular shard, row or stripe of data in a redundancy encoding scheme. For example, in one embodiment, a shard slot corresponds to an erasure coding matrix row. In some embodiments, storage node registrar store 250 also stores information about volumes or volume components such as total, used and free space, number of data objects stored and the like.

In some embodiments, data plane 214 also includes a storage allocator 256 for allocating storage space (e.g., volumes) on storage nodes to store new data objects, based at least in part on information maintained by storage node registrar store 250, to satisfy data isolation and fault tolerance constraints. In some embodiments, storage allocator 256 requires manual intervention.

In some embodiments, data plane 214 also includes an anti-entropy watcher 252 for detecting entropic effects and initiating anti-entropy correction routines. For example, anti-entropy watcher 252 may be responsible for monitoring activities and status of all storage entities such as storage nodes, reconciling live or actual data with maintained data and the like. In various embodiments, entropic effects include, but are not limited to, performance degradation due to data fragmentation resulting from repeated write and rewrite cycles, hardware wear (e.g., of magnetic media), data unavailability and/or data loss due to hardware/software malfunction, environmental factors, physical destruction of hardware, random chance or other causes. Anti-entropy watcher 252 may detect such effects and in some embodiment may preemptively and/or reactively institute anti-entropy correction routines and/or policies.

In an embodiment, anti-entropy watcher 252 causes storage nodes 246 to perform periodic anti-entropy scans on storage devices connected to the storage nodes. Anti-entropy watcher 252 may also inject requests in job request queue 236 (and subsequently job result queue 242) to collect information, recover data and the like. In some embodiments, anti-entropy watcher 252 may perform scans, for example, on cold index store 262, described below, and storage nodes 246, to ensure referential integrity.

In an embodiment, information stored at storage node registrar store 250 is used by a variety of services such as storage node registrar 248, storage allocator 256, anti-entropy watcher 252 and the like. For example, storage node registrar 248 may provide data location and placement services (e.g., to storage node managers 244) during data storage, retrieval and deletion. For example, given the size of a data object to be stored and information maintained by storage node register store 250, a storage node register 248 may determine where (e.g., volume) to store the data object and provides an indication of the storage location of the data object which may be used to generate a data object identifier associated with the data object. As another example, in an embodiment, storage allocator 256 uses information stored in storage node registrar store 250 to create and place volume components for new volumes in specific storage nodes to satisfy isolation and fault tolerance constraints. As yet another example, in an embodiment, anti-entropy watcher 252 uses information stored in storage node registrar store 250 to detect entropic effects such as data loss, hardware failure and the like.

In some embodiments, data plane 214 also includes an orphan cleanup data store 254, which is used to track orphans in the storage system. As used herein, an orphan is a stored data object that is not referenced by any external entity. In various embodiments, orphan cleanup data store 254 may be implemented by a NoSQL data management system, such as a key-value data store, an RDBMS or any other data storage system. In some embodiments, storage node registrars 248 stores object placement information in orphan cleanup data store 254. Subsequently, information stored in orphan cleanup data store 254 may be compared, for example, by an anti-entropy watcher 252, with information maintained in metadata plane 216. If an orphan is detected, in some embodiments, a request is inserted in the common control plane 212 to delete the orphan.

Referring now to metadata plane 216 illustrated in FIG. 2. In various embodiments, metadata plane 216 provides information about data objects stored in the system for inventory and accounting purposes, to satisfy customer metadata inquiries and the like. In the illustrated embodiment, metadata plane 216 includes a metadata manager job store 258 which stores information about executed transactions based on entries from job result queue 242 in common control plane 212. In various embodiments, metadata manager job store 258 may be implemented by a NoSQL data management system, such as a key-value data store, a RDBMS or any other data storage system. In some embodiments, metadata manager job store 258 is partitioned and sub-partitioned, for example, based on logical data containers, to facilitate parallel processing by multiple instances of services such as metadata manager 260.

In the illustrative embodiment, metadata plane 216 also includes one or more metadata managers 260 for generating a cold index of data objects (e.g., stored in cold index store 262) based on records in metadata manager job store 258. As used herein, a "cold" index refers to an index that is updated infrequently. In various embodiments, a cold index is maintained to reduce cost overhead. In some embodiments, multiple metadata managers 260 may periodically read and process records from different partitions in metadata manager job store 258 in parallel and store the result in a cold index store 262.

In some embodiments cold index store 262 may be implemented by a reliable and durable data storage service. In some embodiments, cold index store 262 is configured to handle metadata requests initiated by customers. For example, a customer may issue a request to list all data objects contained in a given logical data container. In response to such a request, cold index store 262 may provide a list of identifiers of all data objects contained in the logical data container based on information maintained by cold index 262. In some embodiments, an operation may take a relative long period of time and the customer may be provided a job identifier to retrieve the result when the job is done. In other embodiments, cold index store 262 is configured to handle inquiries from other services, for example, from front end 208 for inventory, accounting and billing purposes.

In some embodiments, metadata plane 216 may also include a container metadata store 264 that stores information about logical data containers such as container ownership, policies, usage and the like. Such information may be used, for example, by front end 208 services, to perform authorization, metering, accounting and the like. In various embodiments, container metadata store 264 may be implemented by a NoSQL data management system, such as a key-value data store, a RDBMS or any other data storage system.

As described herein, in various embodiments, the archival data storage system 206 described herein is implemented to be efficient and scalable. For example, in an embodiment, batch processing and request coalescing is used at various stages (e.g., front end request handling, control plane job request handling, data plane data request handling) to improve efficiency. For another example, in an embodiment, processing of metadata such as jobs, requests and the like are partitioned so as to facilitate parallel processing of the partitions by multiple instances of services.

In an embodiment, data elements stored in the archival data storage system (such as data components, volumes, described below) are self-describing so as to avoid the need for a global index data structure. For example, in an embodiment, data objects stored in the system may be addressable by data object identifiers that encode storage location information. For another example, in an embodiment, volumes may store information about which data objects are stored in the volume and storage nodes and devices storing such volumes may collectively report their inventory and hardware information to provide a global view of the data stored in the system (such as evidenced by information stored in storage node registrar store 250). In such an embodiment, the global view is provided for efficiency only and not required to locate data stored in the system.

In various embodiments, the archival data storage system described herein is implemented to improve data reliability and durability. For example, in an embodiment, a data object is redundantly encoded into a plurality of data components and stored across different data storage entities to provide fault tolerance. For another example, in an embodiment, data elements have multiple levels of integrity checks. In an embodiment, parent/child relations always have additional information to ensure full referential integrity. For example, in an embodiment, bulk data transmission and storage paths are protected by having the initiator pre-calculate the digest on the data before transmission and subsequently supply the digest with the data to a receiver. The receiver of the data transmission is responsible for recalculation, comparing and then acknowledging to the sender that includes the recalculated digest. Such data integrity checks may be implemented, for example, by front end services, transient data storage services, data plane storage entities and the like described above.

Figure 3:
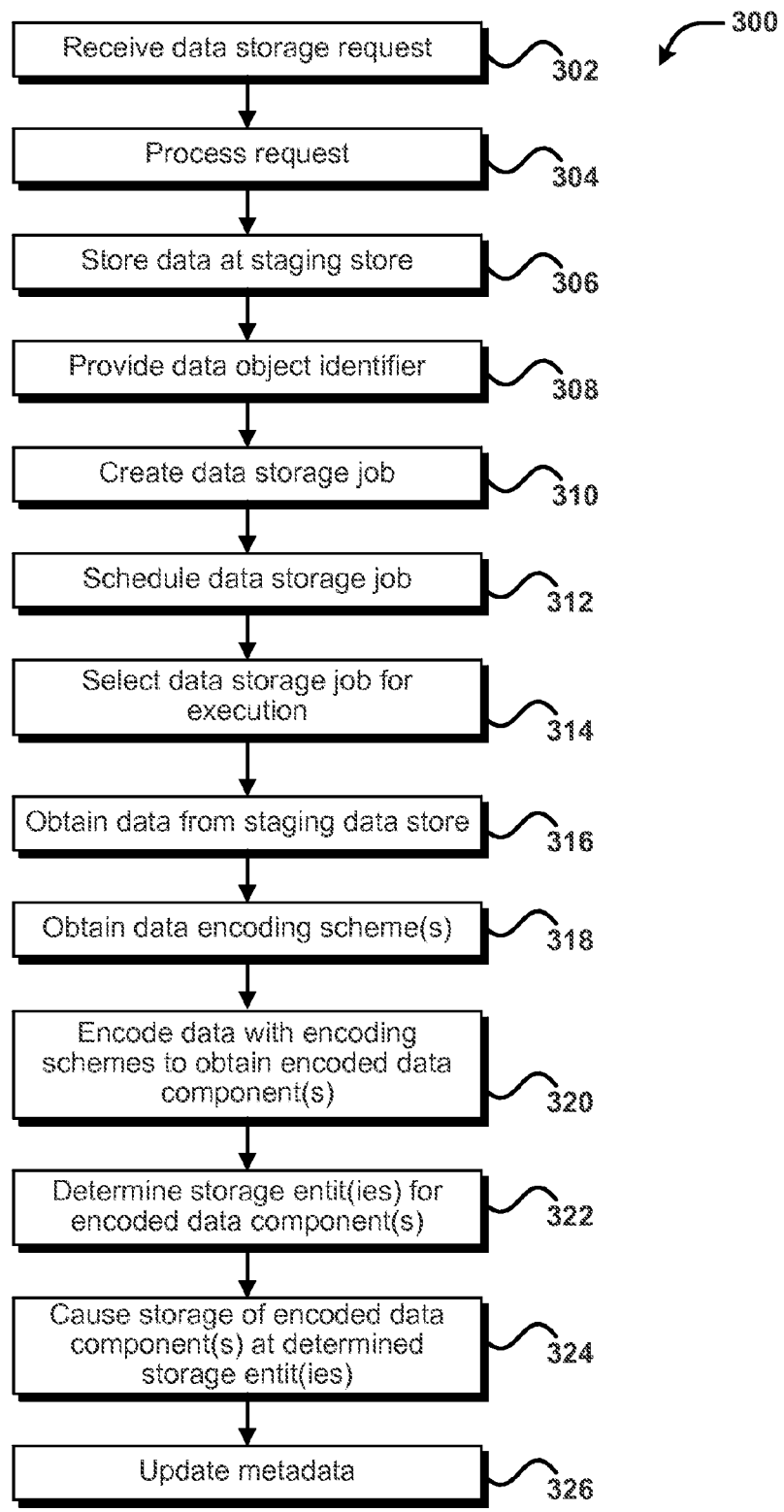
FIG. 3 illustrates an example process for storing data, in accordance with at least one embodiment.

FIG. 3 illustrates an example process 300 for storing data, in accordance with one embodiment. Some or all of process 300 (or any other processes described herein or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In an embodiment, one or more components of archival data storage system 206 as described in connection with FIG. 2 may perform process 300, as described below, although other variations are considered to be within the scope of the present disclosure.

In an embodiment, process 300 includes receiving 302 a data storage request to store archival data such as a document, a video or audio file or the like. Such a data storage request may include payload data and metadata such as size and digest of the payload data, user identification information (e.g., user name, account identifier and the like), a logical data container identifier and the like. In some embodiments, process 300 may include receiving 302 multiple storage requests each including a portion of larger payload data. In other embodiments, a storage request may include multiple data objects to be uploaded. In an embodiment, step 302 of process 300 is implemented by a service such as API request handler 218 of front end 208 as described in connection with FIG. 2.

In an embodiment, process 300 includes processing 304 the storage request upon receiving 302 the request. Such processing may include, for example, verifying the integrity of data received, authenticating the customer, authorizing requested access against access control policies, performing meter- and accounting-related activities and the like. In an embodiment, such processing may be performed by services of front end 208 such as described in connection with FIG. 2. In an embodiment, such a request may be processed in connection with other requests, for example, in batch mode.

In an embodiment, process 300 includes storing 306 the data associated with the storage request in a staging data store. Such staging data store may include a transient data store such as provided by payload data cache 228 as described in connection with FIG. 2, archival data store such as provided by components in data plane 214 of FIG. 2. In some embodiments, only payload data is stored in the staging store. In other embodiments, metadata related to the payload data may also be stored in the staging store. In an embodiment, data integrity is validated (e.g., based on a digest) before being stored at a staging data store.

In an embodiment, process 300 includes providing 308 a data object identifier associated with the data to be stored, for example, in a response to the storage request. As described above, a data object identifier may be used by subsequent requests to retrieve, delete or otherwise reference data stored. In an embodiment, a data object identifier may encode storage location information that may be used to locate the stored data object, payload validation information such as size, digest, timestamp and the like that may be used to validate the integrity of the payload data, metadata validation information such as error-detection codes that may be used to validate the integrity of metadata such as the data object identifier itself and information encoded in the data object identifier and the like. In an embodiment, a data object identifier may also encode information used to validate or authorize subsequent customer requests. For example, a data object identifier may encode the identifier of the logical data container that the data object is stored in. In a subsequent request to retrieve this data object, the logical data container identifier may be used to determine whether the requesting entity has access to the logical data container and hence the data object container herein. In some embodiments, the data object identifier may encode information based on information supplied by a customer (e.g., a digest, a friendly name for the data object and the like) and/or information collected or calculated by the system performing process 300 (e.g., storage location information). In some embodiments, generating a data object identifier may include encrypting some or all of the information described above using a cryptographic private key. In some embodiments, the cryptographic private key may be periodically rotated.

In an embodiment, providing 308 a data object identifier may include determining a storage location for the before the data is actually stored there. For example, such determination may be based at least in part on inventory information about existing data storage entities such as operational status (e.g., active or inactive), available storage space, data isolation requirement and the like. In an environment such as environment 200 illustrated by FIG. 2, such determination may be implemented by a service such as storage node registrar 248 as described above in connection with FIG. 2. In some embodiments, such determination may include allocating new storage space (e.g., volume) on one or more physical storage devices by a service such as storage allocator 236 as described in connection with FIG. 2.

In an embodiment, a storage location identifier may be generated to represent the storage location determined above. Such a storage location identifier may include, for example, a volume reference object which comprises a volume identifier component and data object identifier component. The volume reference component may identify the volume the data is stored on and the data object identifier component may identify where in the volume the data is stored. In general, the storage location identifier may comprise components that identify various levels within a logical or physical data storage topology (such as a hierarchy) in which data is organized. In some embodiments, the storage location identifier may point to where actual payload data is stored or a chain of reference to where the data is stored.

In an embodiments, a data object identifier encodes a digest (e.g., a hash) of at least a portion of the data to be stored, such as the payload data. In some embodiments, the digest may be based at least in part on a customer-provided digest. In other embodiments, the digest may be calculated from scratch based on the payload data.

In an embodiment, process 300 includes creating 310 a storage job for persisting data to a long-term store and scheduling 312 the storage job for execution. In environment 200 as described in connection with FIG. 2, steps 308, 310 and 312 may be implemented at least in part by components of control plane for direct I/O 210 and common control plane 212 as described above. Specifically, in an embodiment, job tracker 230 creates a job record and stores the job record in job tracker store 232. As described above, job tracker 230 may perform batch processing to reduce the total number of transactions against job tracker store 232. Additionally, job tracker store 232 may be partitioned or otherwise optimized to facilitate parallel processing, cleanup operations and the like. A job record, as described above, may include job-related information such as a customer account identifier, job identifier, storage location identifier, reference to data stored in payload data cache 228, job status, job creation and/or expiration time and the like.

In an embodiment, scheduling 312 the storage job for execution includes performing job planning and optimization, such as queue-based load leveling or balancing, job partitioning and the like, as described in connection with common control plane 212 of FIG. 2. For example, in an embodiment, job request balancer 238 transfers job items from job request queue 236 to storage node manager job store 240 according to a scheduling algorithm so as to dampen peak to average load levels (jobs) coming from control plane for I/O 210 and to deliver manageable workload to data plane 214. As another example, storage node manager job store 240 may be partitioned to facilitate parallel processing of the jobs by multiple workers such as storage node managers 244. As yet another example, storage node manager job store 240 may provide querying, sorting and other functionalities to facilitate batch processing and other job optimizations.

In an embodiment, process 300 includes selecting 314 the storage job for execution, for example, by a storage node manager 244 from storage node manager job stored 240 as described in connection with FIG. 2. The storage job may be selected 314 with other jobs for batch processing or otherwise selected as a result of job planning and optimization described above.

In an embodiment, process 300 includes obtaining 316 data from a staging store, such as payload data cache 228 described above in connection with FIG. 2. In some embodiments, the integrity of the data may be checked, for example, by verifying the size, digest, an error-detection code and the like.

In an embodiment, process 300 includes obtaining 318 one or more data encoding schemes such as an encryption scheme, a redundancy encoding scheme such as erasure encoding and redundant array of independent disks (RAID) encoding schemes and the like. In some embodiments, such encoding schemes evolve to adapt to different requirements. For example, encryption keys may be rotated periodically and stretch factor of an erasure coding scheme may be adjusted over time to different hardware configurations, redundancy requirements and the like.

In an embodiment, process 300 includes encoding 320 with the obtained encoding schemes. For example, in an embodiment, data is encrypted and the encrypted data is erasure-encoded. In an embodiment, storage node managers 244 described in connection with FIG. 2 may be configured to perform the data encoding described herein. In an embodiment, application of such encoding schemes generates a plurality of encoded data components or shards, which may be stored across different storage entities such as storage devices, storage nodes, datacenters and the like to provide fault tolerance.

In an embodiment, process 300 includes determining 322 the storage entities for such encoded data components. For example, in an environment 200 illustrated by FIG. 2, a storage node manager 244 may determine the plurality of storage nodes 246 to store the encoded data components by querying a storage node registrar 248 using a volume identifier. Such a volume identifier may be part of a storage location identifier associated with the data to be stored. In response to the query with a given volume identifier, in an embodiment, storage node registrar 248 returns a list of network locations (including endpoints, DNS names, IP addresses and the like) of storage nodes 246 to store the encoded data components. As described in connection with FIG. 2, storage node registrar 248 may determine such a list based on self-reported and dynamically provided and/or updated inventory information from storage nodes 246 themselves. In some embodiments, such determination is based on data isolation, fault tolerance, load balancing, power conservation, data locality and other considerations. In some embodiments, storage registrar 248 may cause new storage space to be allocated, for example, by invoking storage allocator 236 as described in connection with FIG. 2.

In an embodiment, process 300 includes causing 324 storage of the encoded data component(s) at the determined storage entities. For example, in an environment 200 illustrated by FIG. 2, a storage node manager 244 may request each of the storage nodes 246 determined above to store a data component at a given storage location. Each of the storage nodes 246, upon receiving the storage request from storage node manager 244 to store a data component, may cause the data component to be stored in a connected storage device. In some embodiments, at least a portion of the data object identifier is stored with all or some of the data components in either encoded or unencoded form. In some embodiments, a storage node 246 may perform batch processing or other optimizations to process requests from storage node managers 244.

In an embodiment, a storage node 246 sends an acknowledgement to the requesting storage node manager 244 indicating whether data is stored successfully. In some embodiments, a storage node 246 returns an error message, when for some reason, the request cannot be fulfilled. For example, if a storage node receives two requests to store to the same storage location, one or both requests may fail. In an embodiment, a storage node 246 performs validation checks prior to storing the data and returns an error if the validation checks fail. For example, data integrity may be verified by checking an error-detection code or a digest. As another example, storage node 246 may verify, for example, based on a volume index, that the volume identified by a storage request is stored by the storage node and/or that the volume has sufficient space to store the data component.

In some embodiments, data storage is considered successful when storage node manager 244 receives positive acknowledgement from at least a subset (a storage quorum) of requested storage nodes 246. In some embodiments, a storage node manager 244 may wait until the receipt of a quorum of acknowledgement before removing the state necessary to retry the job. Such stare information may include encoded data components for which an acknowledgement has not been received. In other embodiments, to improve the throughput, a storage node manager 244 may remove the state necessary to retry the job before receiving a quorum of acknowledgement.

In an embodiment, process 300 includes updating 326 metadata information including, for example, metadata maintained by data plane 214 (such as index and storage space information for a storage device, mapping information stored at storage node registrar store 230 and the like), metadata maintained by control planes 210 and 212 (such as job-related information), metadata maintained by metadata plane 216 (such as a cold index) and the like. In various embodiments, some of such metadata information may be updated via batch processing and/or on a periodic basis to reduce performance and cost impact. For example, in data plane 214, information maintained by storage node registrar store 230 may be updated to provide additional mapping of the volume identifier of the newly stored data and the storage nodes 246 on which the data components are stored, if such a mapping is not already there. For another example, volume index on storage devices may be updated to reflect newly added data components In common control plane 212, job entries for completed jobs may be removed from storage node manager job store 240 and added to job result queue 242 as described in connection with FIG. 2. In control plane for direct I/O 210, statuses of job records in job tracker store 232 may be updated, for example, by job tracker 230 which monitors the job result queue 242. In various embodiments, a job that fails to complete may be retried for a number of times. For example, in an embodiment, a new job may be created to store the data at a different location. As another example, an existing job record (e.g., in storage node manager job store 240, job tracker store 232 and the like) may be updated to facilitate retry of the same job.

In metadata plane 216, metadata may be updated to reflect the newly stored data. For example, completed jobs may be pulled from job result queue 242 into metadata manager job store 238 and batch-processed by metadata manager 240 to generate an updated index such as stored in cold index store 242. For another example, customer information may be updated to reflect changes for metering and accounting purposes.

Finally, in some embodiments, once a storage job is completed successfully, job records, payload data and other data associated with a storage job may be removed, for example, by a cleanup agent 234 as described in connection with FIG. 2. In some embodiments, such removal may be processed by batch processing, parallel processing or the like.

Figure 4:
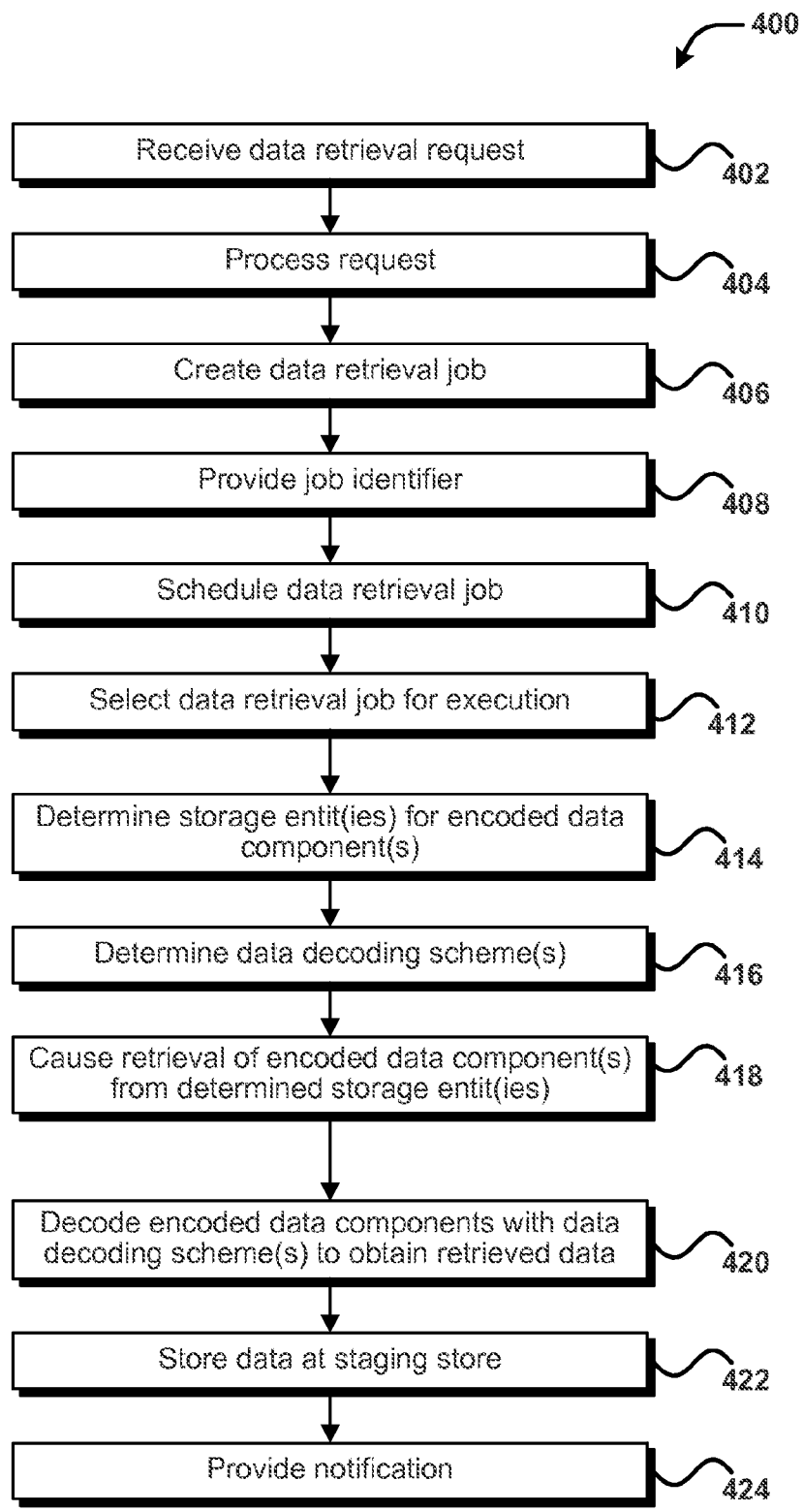
FIG. 4 illustrates an example process for retrieving data, in accordance with at least one embodiment.

FIG. 4 illustrates an example process 400 for retrieving data, in accordance with one embodiment. In an embodiment, one or more components of archival data storage system 206 as described in connection with FIG. 2 collectively perform process 400.

In an embodiment, process 400 includes receiving 402 a data retrieval request to retrieve data such as stored by process 300, described above. Such a data retrieval request may include a data object identifier, such as provided by step 308 of process 300, described above, or any other information that may be used to identify the data to be retrieved.

In an embodiment, process 400 includes processing 404 the data retrieval request upon receiving 402 the request. Such processing may include, for example, authenticating the customer, authorizing requested access against access control policies, performing meter and accounting related activities and the like. In an embodiment, such processing may be performed by services of front end 208 such as described in connection with FIG. 2. In an embodiment, such request may be processed in connection with other requests, for example, in batch mode.

In an embodiment, processing 404 the retrieval request may be based at least in part on the data object identifier that is included in the retrieval request. As described above, data object identifier may encode storage location information, payload validation information such as size, creation timestamp, payload digest and the like, metadata validation information, policy information and the like. In an embodiment, processing 404 the retrieval request includes decoding the information encoded in the data object identifier, for example, using a private cryptographic key and using at least some of the decoded information to validate the retrieval request. For example, policy information may include access control information that may be used to validate that the requesting entity of the retrieval request has the required permission to perform the requested access. As another example, metadata validation information may include an error-detection code such as a cyclic redundancy check ("CRC") that may be used to verify the integrity of data object identifier or a component of it.

In an embodiment, process 400 includes creating 406 a data retrieval job corresponding to the data retrieval request and providing 408 a job identifier associated with the data retrieval job, for example, in a response to the data retrieval request. In some embodiments, creating 406 a data retrieval job is similar to creating a data storage job as described in connection with step 310 of process 300 illustrated in FIG. 3. For example, in an embodiment, a job tracker 230 may create a job record that includes at least some information encoded in the data object identifier and/or additional information such as a job expiration time and the like and store the job record in job tracker store 232. As described above, job tracker 230 may perform batch processing to reduce the total number of transactions against job tracker store 232. Additionally, job tracker store 232 may be partitioned or otherwise optimized to facilitate parallel processing, cleanup operations and the like.

In an embodiment, process 400 includes scheduling 410 the data retrieval job created above. In some embodiments, scheduling 410 the data retrieval job for execution includes performing job planning and optimization such as described in connection with step 312 of process 300 of FIG. 3. For example, the data retrieval job may be submitted into a job queue and scheduled for batch processing with other jobs based at least in part on system load, power management schedules and the like. For another example, the data retrieval job may be coalesced with other retrieval jobs based on data locality and the like.

In an embodiment, process 400 includes selecting 412 the data retrieval job for execution, for example, by a storage node manager 244 from storage node manager job store 240 as described in connection with FIG. 2. The retrieval job may be selected 412 with other jobs for batch processing or otherwise selected as a result of job planning and optimization described above.

In an embodiment, process 400 includes determining 414 the storage entities that store the encoded data components that are generated by a storage process such as process 300 described above. In an embodiment, a storage node manager 244 may determine a plurality of storage nodes 246 to retrieve the encoded data components in a manner similar to that discussed in connection with step 322 of process 300, above. For example, such determination may be based on load balancing, power conservation, efficiency and other considerations.

In an embodiment, process 400 includes determining 416 one or more data decoding schemes that may be used to decode retrieved data. Typically, such decoding schemes correspond to the encoding schemes applied to the original data when the original data is previously stored. For example, such decoding schemes may include decryption with a cryptographic key, erasure-decoding and the like.

In an embodiment, process 400 includes causing 418 retrieval of at least some of the encoded data components from the storage entities determined in step 414 of process 400. For example, in an environment 200 illustrated by FIG. 2, a storage node manager 244 responsible for the data retrieval job may request a subset of storage nodes 246 determined above to retrieve their corresponding data components. In some embodiments, a minimum number of encoded data components is needed to reconstruct the original data where the number may be determined based at least in part on the data redundancy scheme used to encode the data (e.g., stretch factor of an erasure coding). In such embodiments, the subset of storage nodes may be selected such that no less than the minimum number of encoded data components is retrieved.

Each of the subset of storage nodes 246, upon receiving a request from storage node manager 244 to retrieve a data component, may validate the request, for example, by checking the integrity of a storage location identifier (that is part of the data object identifier), verifying that the storage node indeed holds the requested data component and the like. Upon a successful validation, the storage node may locate the data component based at least in part on the storage location identifier. For example, as described above, the storage location identifier may include a volume reference object which comprises a volume identifier component and a data object identifier component where the volume reference component to identify the volume the data is stored and a data object identifier component may identify where in the volume the data is stored. In an embodiment, the storage node reads the data component, for example, from a connected data storage device and sends the retrieved data component to the storage node manager that requested the retrieval. In some embodiments, the data integrity is checked, for example, by verifying the data component identifier or a portion thereof is identical to that indicated by the data component identifier associated with the retrieval job. In some embodiments, a storage node may perform batching or other job optimization in connection with retrieval of a data component.

In an embodiment, process 400 includes decoding 420, at least the minimum number of the retrieved encoded data components with the one or more data decoding schemes determined at step 416 of process 400. For example, in one embodiment, the retrieved data components may be erasure decoded and then decrypted. In some embodiments, a data integrity check is performed on the reconstructed data, for example, using payload integrity validation information encoded in the data object identifier (e.g., size, timestamp, digest). In some cases, the retrieval job may fail due to a less-than-minimum number of retrieved data components, failure of data integrity check and the like. In such cases, the retrieval job may be retried in a fashion similar to that described in connection with FIG. 3.

In an embodiment, process 400 includes storing reconstructed data in a staging store such as payload data cache 228 described in connection with FIG. 2. In some embodiments, data stored 422 in the staging store may be available for download by a customer for a period of time or indefinitely. In an embodiment, data integrity may be checked (e.g., using a digest) before the data is stored in the staging store.

In an embodiment, process 400 includes providing 424 a notification of the completion of the retrieval job to the requestor of the retrieval request or another entity or entities otherwise configured to receive such a notification. Such notifications may be provided individually or in batches. In other embodiments, the status of the retrieval job may be provided upon a polling request, for example, from a customer.

Figure 5:
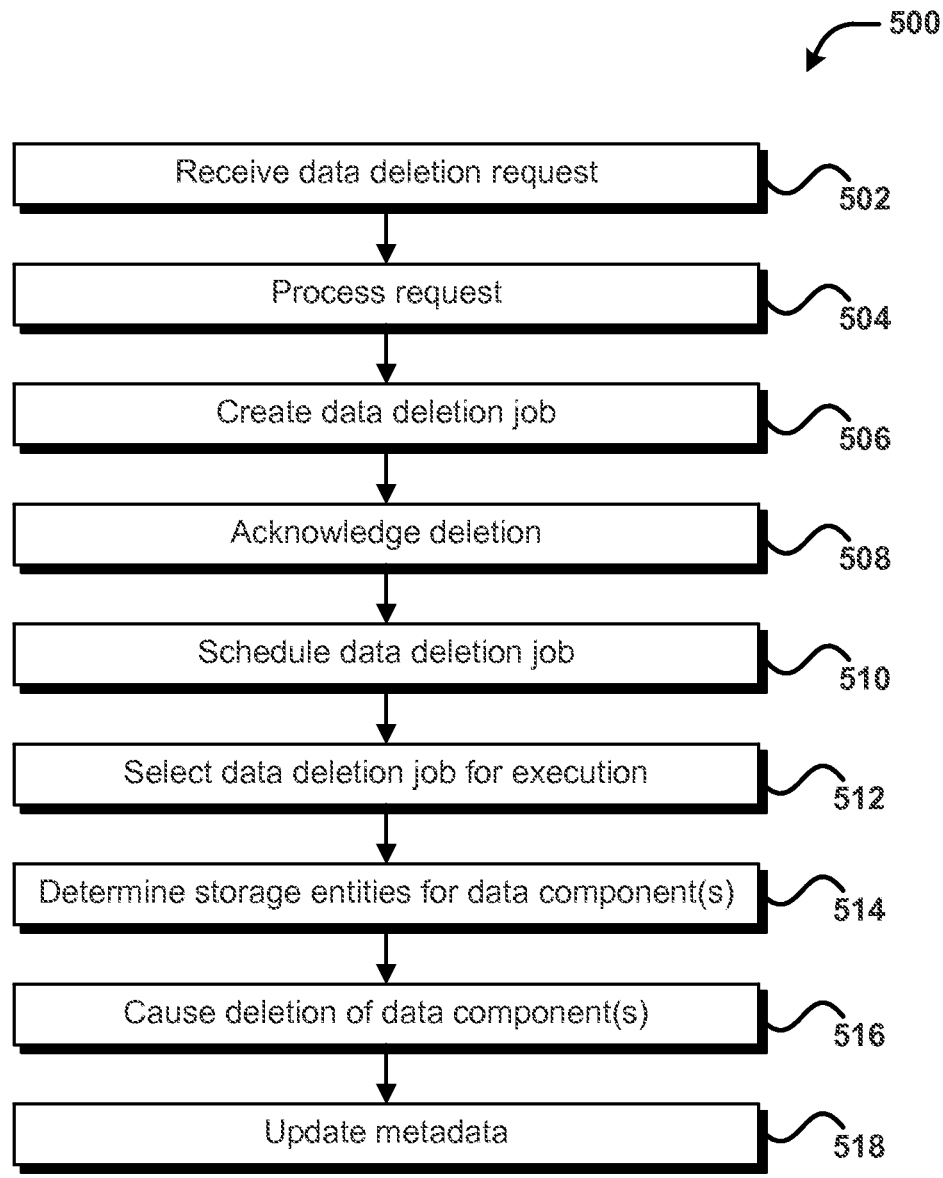
FIG. 5 illustrates an example process for deleting data, in accordance with one embodiment.

FIG. 5 illustrates an example process 500 for deleting data, in accordance with one embodiment. In an embodiment, one or more components of archival data storage system 206 as described in connection with FIG. 2 collectively perform process 500.

In an embodiment, process 500 includes receiving 502 a data deletion request to delete data such as stored by process 300, described above. Such a data retrieval request may include a data object identifier, such as provided by step 308 of process 300, described above, or any other information that may be used to identify the data to be deleted.

In an embodiment, process 500 includes processing 504 the data deletion request upon receiving 502 the request. In some embodiments, the processing 504 is similar to that for step 304 of process 300 and step 404 of process 400, described above. For example, in an embodiment, the processing 504 is based at least in part on the data object identifier that is included in the data deletion request.

In an embodiment, process 500 includes creating 506 a data retrieval job corresponding to the data deletion request. Such a retrieval job may be created similar to the creation of storage job described in connection with step 310 of process 300 and the creation of the retrieval job described in connection with step 406 of process 400.

In an embodiment, process 500 includes providing 508 an acknowledgement that the data is deleted. In some embodiments, such acknowledgement may be provided in response to the data deletion request so as to provide a perception that the data deletion request is handled synchronously. In other embodiments, a job identifier associated with the data deletion job may be provided similar to the providing of job identifiers for data retrieval requests.

In an embodiment, process 500 includes scheduling 508 the data deletion job for execution. In some embodiments, scheduling 508 of data deletion jobs may be implemented similar to that described in connection with step 312 of process 300 and in connection with step 410 of process 400, described above. For example, data deletion jobs for closely-located data may be coalesced and/or batch processed. For another example, data deletion jobs may be assigned a lower priority than data retrieval jobs.

In some embodiments, data stored may have an associated expiration time that is specified by a customer or set by default. In such embodiments, a deletion job may be created 506 and schedule 510 automatically on or near the expiration time of the data. In some embodiments, the expiration time may be further associated with a grace period during which data is still available or recoverable. In some embodiments, a notification of the pending deletion may be provided before, on or after the expiration time.

In some embodiments, process 500 includes selecting 512 the data deletion job for execution, for example, by a storage node manager 244 from storage node manager job stored 240 as described in connection with FIG. 2. The deletion job may be selected 512 with other jobs for batch processing or otherwise selected as a result of job planning and optimization described above.

In some embodiments, process 500 includes determining 514 the storage entities for data components that store the data components that are generated by a storage process such as process 300 described above. In an embodiment, a storage node manager 244 may determine a plurality of storage nodes 246 to retrieve the encoded data components in a manner similar to that discussed in connection with step 414 of process 400 described above.

In some embodiments, process 500 includes causing 516 the deletion of at least some of the data components. For example, in an environment 200 illustrated by FIG. 2, a storage node manager 244 responsible for the data deletion job may identify a set of storage nodes that store the data components for the data to be deleted and requests at least a subset of those storage nodes to delete their respective data components. Each of the subset of storage node 246, upon receiving a request from storage node manager 244 to delete a data component, may validate the request, for example, by checking the integrity of a storage location identifier (that is part of the data object identifier), verifying that the storage node indeed holds the requested data component and the like. Upon a successful validation, the storage node may delete the data component from a connected storage device and sends an acknowledgement to storage node manager 244 indicating whether the operation was successful. In an embodiment, multiple data deletion jobs may be executed in a batch such that data objects located close together may be deleted as a whole. In some embodiments, data deletion is considered successful when storage node manager 244 receives positive acknowledgement from at least a subset of storage nodes 246. The size of the subset may be configured to ensure that data cannot be reconstructed later on from undeleted data components. Failed or incomplete data deletion jobs may be retried in a manner similar to the retrying of data storage jobs and data retrieval jobs, described in connection with process 300 and process 400, respectively.

In an embodiment, process 500 includes updating 518 metadata information such as that described in connection with step 326 of process 300. For example, storage nodes executing the deletion operation may update storage information including index, free space information and the like. In an embodiment, storage nodes may provide updates to storage node registrar or storage node registrar store. In various embodiments, some of such metadata information may be updated via batch processing and/or on a periodic basis to reduce performance and cost impact.

Figure 6:
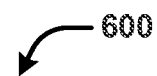
FIG. 6 illustrates an example schema for associating information with logical data containers, in accordance with at least one embodiment.

As noted, various embodiments of the present disclosure utilize a write horizon value (also referred to simply as a "write horizon") to enforce conditions for deleting data. FIG. 6 shows an illustrative representation of an example table 600 used to track write horizons for logical data containers. The table 600, in this example, associates each logical data container of a plurality of logical data containers with information used to enforce conditions on deleting data. As illustrated, the table 600, for each of the logical data containers, associates a logical data container identifier (in this case, a name for the logical data container identifier, although other identifiers may be used) with a number of data objects in the logical data container identifier and with a write horizon.

As shown in FIG. 6, the write horizon for various logical data containers may vary among themselves. In an embodiment, the write horizon for a logical data container is only updated when a request to add data to the logical data container is received. Thus, if a logical data container is, with respect to write operations, relatively inactive, the write horizon for the logical data container may be lower than the write horizon of other logical data containers to which data was more recently written. In some embodiments, the write horizon can also be zero, such as if a user of a data storage system submits an API call to create a logical data container, but has not yet submitted any API calls to add any data objects to the logical data container.

In an embodiment, the table 600 is store by the metering system 224 described in FIG. 2, although the table 600 may be stored in other locations. In an embodiment, the table 600 is a table of a relational database, although other data storage systems may be used to store the table 600. In addition, while the table 600 is illustrated as having three columns, the table may be modified to have additional columns for additional data which may be used in various embodiments. Further, while shown in a single table, data stored by the table 600 may also be stored in multiple tables. For instance, the data of the table 600 may be stored in two tables, each table associating logical data container identifiers with either the number of archives or the write horizon. Generally, any way of storing the data for the table 600 so as to associate logical data containers with relevant data may be used.

As noted, data storage systems used in accordance with various embodiments may operate on the notion of generations. FIG. 7, accordingly, shows an illustrative example table 700 that stores information for a generation. In an embodiment, a data storage system, such as the data storage system described above in connection with FIG. 2, processes metadata for logical data containers and associated data objects using batch processes. The table 700, accordingly, stores information for a plurality of updates to data objects. In this example, the table 700 stores a set of updates for a current generation until the updates may be stored in a cold data store, such as described above. Referring to FIG. 2, the table may be stored by the metadata manager job store 258 until processed by the metadata manager 260 and stored in the cold index store 262. The table may be stored in any suitable manner, such as in manners described above in connection with FIG. 6.

As illustrated, the table stores updates and associates those updates with corresponding data objects. Accordingly, the table 700 includes a column for data object identifiers and operations. The data object identifiers may be as described above. The operations may be any operations that may be performed on data objects by a data storage system. Example operations include upload operations and delete operations. In an embodiment, the table 700 is processed on an all or nothing basis. In the example of FIG. 2, if the metadata manager is unable to process the complete table (i.e., cause to be stored in the cold index store 262), the table is reprocessed from the beginning. Once the complete table is processed, in an embodiment, the generation number is updated. In an embodiment, updating the generation number is performed by increasing the generation number by 1, although other ways of updating the generation number may be used.

It should be noted that variations of the table 700 are considered as being within the scope of the present disclosure. For example, in an embodiment, the table 700 stores a set of updates in a system-wide manner. The table 700 may store a set of updates for a complete storage system, such as described above. In other words, a generation is a system-wide value in accordance with various embodiments. As an alternative, each logical data container (or subset of logical data containers) may have its own generation and the techniques described herein may be modified accordingly.

Figure 8:
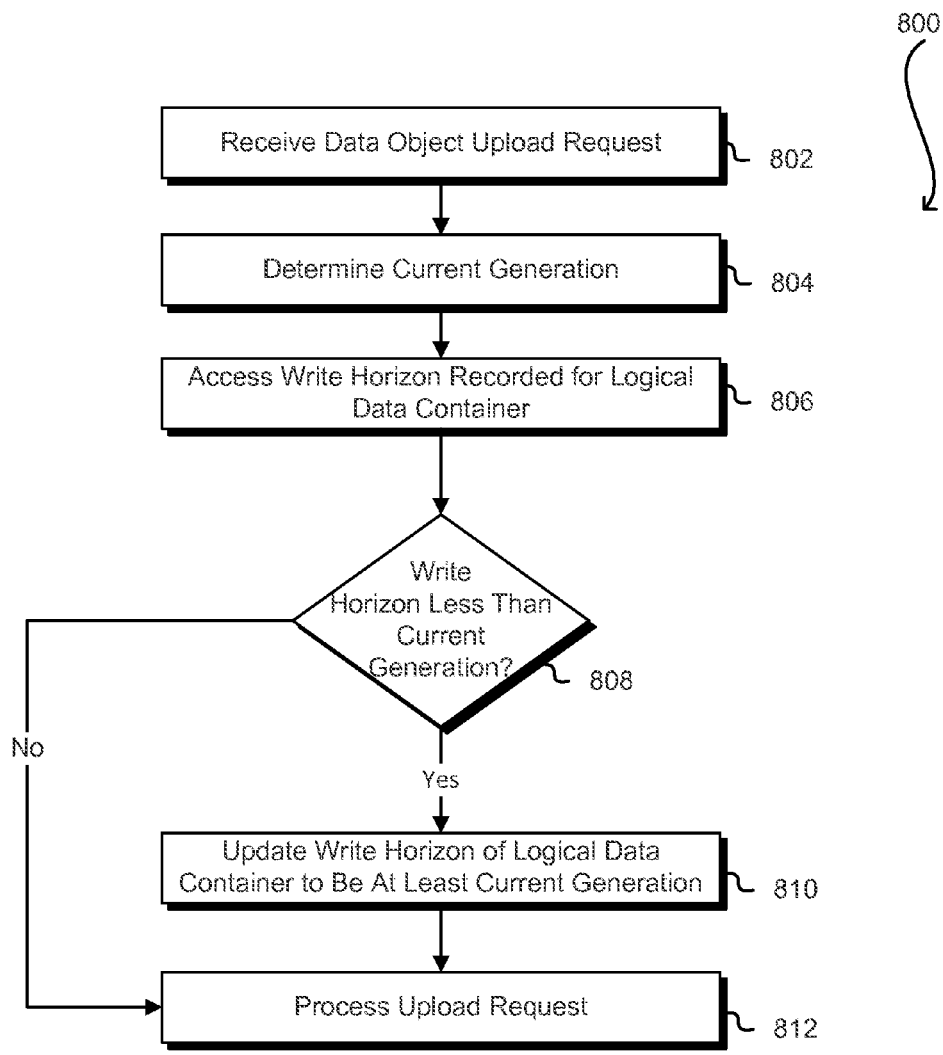
FIG. 8 illustrates an example process for processing upload requests, in accordance with at least one embodiment.

During its operations, a data storage system using a table (or other data storage mechanism), such as the table 600, updates the write horizon values over time. For example, the write horizon for a logical data container may be updated every time a request to add data to the logical data container, such as by adding a data object to the logical data container via an upload request, is received. FIG. 8, accordingly, shows an illustrative example of a process 800 for updating write horizons, in accordance with an embodiment. The process 800 may be performed by the metering system 224 described above or by any suitable computing device. As discussed in more detail below, the process 800 may be used to maintain write horizons so that the write horizons are indicative of possible pending upload requests that has the potential to change the size of corresponding logical data containers, as reflected in a metering database.

Returning to FIG. 8, as illustrated, the process 800 includes receiving a data object upload request. The data object upload request may be received via an API, such as described above. For example, an API call may specify a logical data container to which the data object is to be loaded and other information, such as information required for authenticating the request. Generally, the request may be received in different ways according to the various embodiments. Further, while data object upload requests are used for the purpose of illustration, the process 800 may be adapted to proceed in connection with any request that results in the creation of durable data, that is, data to be persistently stored by a data storage system.

As noted, data storage systems may operate on the basis of generations, where the generations may correspond to a batch process of operations. The process 800, accordingly, includes determining 804 a current generation for a data storage system. The current generation may be a generation of the data storage system to which the upload request is being written, i.e., the generation with which the upload request is to be processed. Determining the current generation may be performed in various ways according to the various embodiments. For instance, referring to the illustrative system of FIG. 2, the metadata manager 260 may publish a current generation to the metering service 224. Similarly, the metering service 224 may poll the metadata manager 260 for the current value, either as a result of having received 802 the request, on a periodic, triggered, or other basis independent of having received the request 802, or otherwise. In addition, determining 804 the current generation may involve calculations. For instance, referring to FIG. 2, the metering service 224 may receive, from a metadata manager 260, an update for a value for the last processed generation once an update to corresponding metadata for logical data container(s) is committed to memory in a database or other data storage mechanism of the metering service 224. For example, when the metering service 224 receives confirmation that operations of a generation were processed, the metering service 224 may update metadata for affected logical data containers, such as updating data object counts and/or other relevant data and update a value for the last processed generation to be that of the generation for which the operations were processed.

In addition, the process 800 includes accessing 806 the write horizon recorded for the logical data container associated with the request that was received 802. Accessing the write horizon may be performed, for instance, by accessing the write horizon from a data store, such as a data store that stores the write horizon in association with an identifier of the logical data container. For example, accessing the write horizon may be performed by querying a database that stores the table 600 described above in connection with FIG. 6. It should be noted that, as with other operations described and/or illustrated herein, the particular order of operations may vary among different embodiments. For example, while illustrated in a particular order in FIG. 8, determining 804 the current generation and accessing 806 the write horizon may be performed in a different order or in parallel.

Once the current generation and write horizon are obtained, in an embodiment, the process 800 includes determining 808 whether the write horizon is less than the current generation. If it is determined 808 that the write horizon is less than the current generation, as illustrated in FIG. 8, the process 800 includes updating 810 the write horizon of the logical data container to be at least the current generation. The updated write horizon may be the current generation or a number that is greater than the current generation. Updating the write horizon may be performed in any suitable manner, such as by submitting an update request to a database that stores the table 600 described above in connection with FIG. 6.

In an embodiment, upon updating 810 the write horizon of the logical data container or upon determining 808 that the write horizon is not less than the current generation, the process 800 includes processing 812 the upload (or other) request. Processing the upload request may include causing data for the data object to be received (in one or more parts), causing the received data to be stored durably by a data storage system, and notifying the requestor that the process has completed. Example processes involved in processing an upload request are described in more detail above. As with other operations discussed herein, processing the upload request may include additional sub-operations. For example, because writing may be a process that takes a period of time, processing the upload request may include performing additional checks to prevent against adverse effects. For instance, a value of a current generation may change during the processing of an upload request, thereby causing a potential for the update 810 of a write horizon to be ineffective for preventing unintended deletion of a logical data container. Accordingly, processing the upload request may include determining, at the end of processing the upload request but before the upload request has been committed, that the logical data container still exists in the data storage system (i.e., has not been deleted) and that the generation has not changed. If the generation has changed, another check and/or update to the write horizon may be performed and the upload request may be processed with the updated generation.

Figure 9:
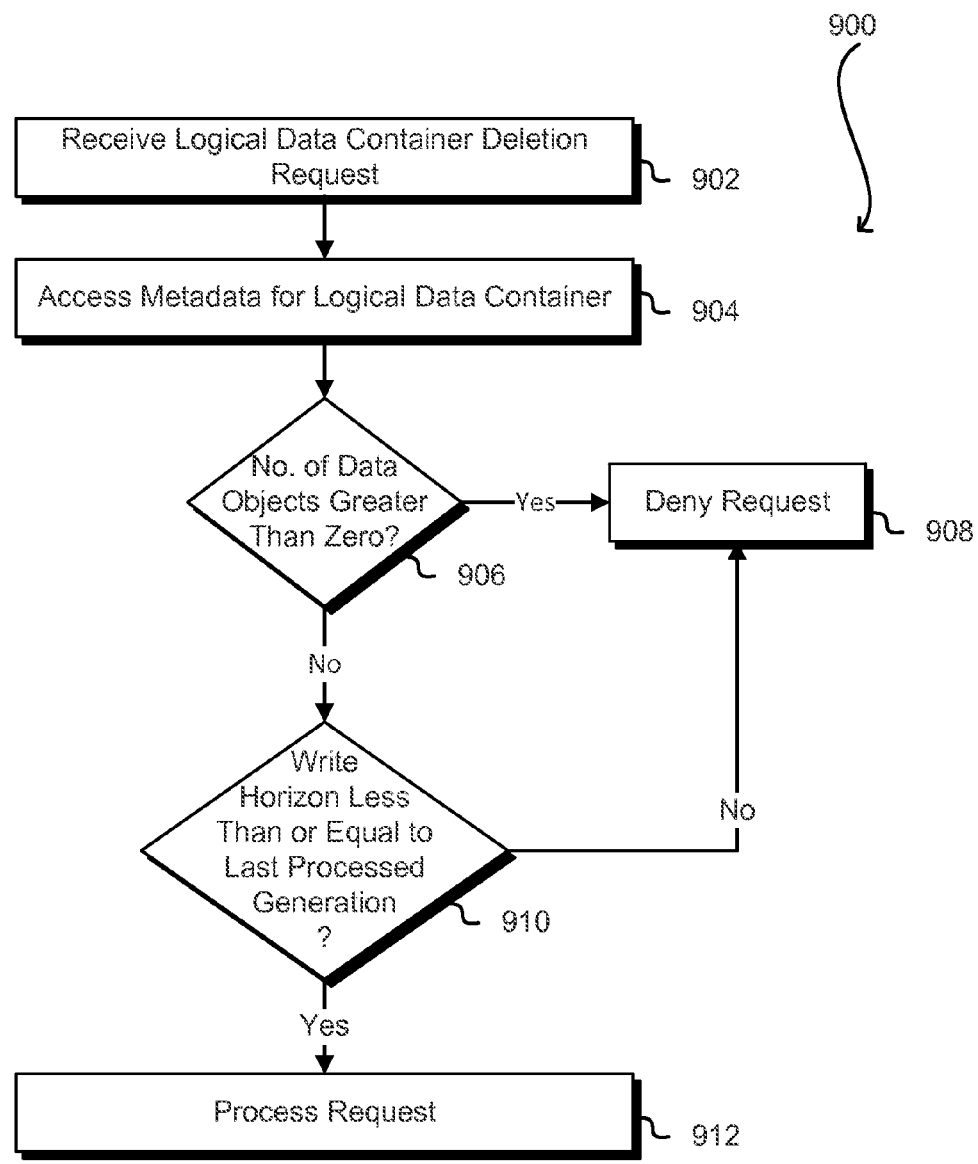
FIG. 9 illustrates an example process for processing data deletion requests, in accordance with at least one embodiment.

As discussed, various embodiments of the present disclosure utilize novel techniques to enforce certain conditions before data can be deleted. FIG. 9, accordingly, shows an illustrative example of a process 900 that may be performed to enforce such conditions in various embodiments. The process 900 may be performed by any suitable device, such as the metering service 224 described above in connection with FIG. 2. In an embodiment, the process 900 includes receiving 902 a logical data container deletion request. The logical data container deletion request may be made according to an API for a storage system and may include various parameters required for proper submission of the request, as described above. Generally, the request may be made in any suitable manner.

As a result of receiving 902 the request, metadata for the logical data container may be accessed 904. Accessing metadata for the logical data container may be performed, for instance, by querying a database that stores the table 600 described above in connection with FIG. 6. The accessed metadata may be used to make 906 a determination on whether the number of data objects currently in the logical data container are greater than zero. In other words, a determination may then be made 906 whether the logical data container is empty. If it is determined 906 that the logical data container has a number of data objects that is greater than zero, the request may be denied 908. Denying the request may be performed in any suitable manner, such as by providing a response indicating the denial or simply not performing the requested deletion operation.

If, however, it is determined 906 that the number of data objects in the logical data container is zero, the process 900 may include using the accessed metadata to determine whether the write horizon for the logical data container is less than or equal to the last processed generation of the data storage system (or of the last container or set of containers to which the generation applies). If it is determined 910 that the write horizon for the logical data container is not less than or equal to the last processed generation, in an embodiment, the process 900 includes denying 908 the request, as described above. If, however, it is determined 910 that the write horizon is not less than or equal to the last processed generation, in an embodiment, the request is processed 912, such as described above. Processing the request may include deleting the logical data container in a storage system in connection with which the request was received 902. Deleting a vault may result in the logical data container being inaccessible for the storage of data objects. Further, deleting the logical data container may include updating various systems (e.g., systems described above in connection with FIG. 2) that track logical data containers and their contents.

Processing 912 the deletion request may include one or more sub-operations. For example, in an embodiment, the operations of checking (906, 910) the conditions and deleting an entry in a data storage system indicating existence of the vault are atomic. In this embodiment, any attempt to update the write horizon at the same time of processing the deletion may cause processing of the deletion request to fail. In this manner, if an attempt to update the write horizon is made after determining 910 whether the write horizon is less than or equal to the last processed generation, but before processing 912 the deletion request is finished, processing the deletion request may be caused to fail. This may be performed using any suitable technique, such as by using conditional writes in a key-value structured storage system to ensure that none of the fields that were checked have changed when completing processing of the deletion request, using a transaction in a relational database, using a lock on a value that was checked and/or in any other suitable manner.

Figure 10:
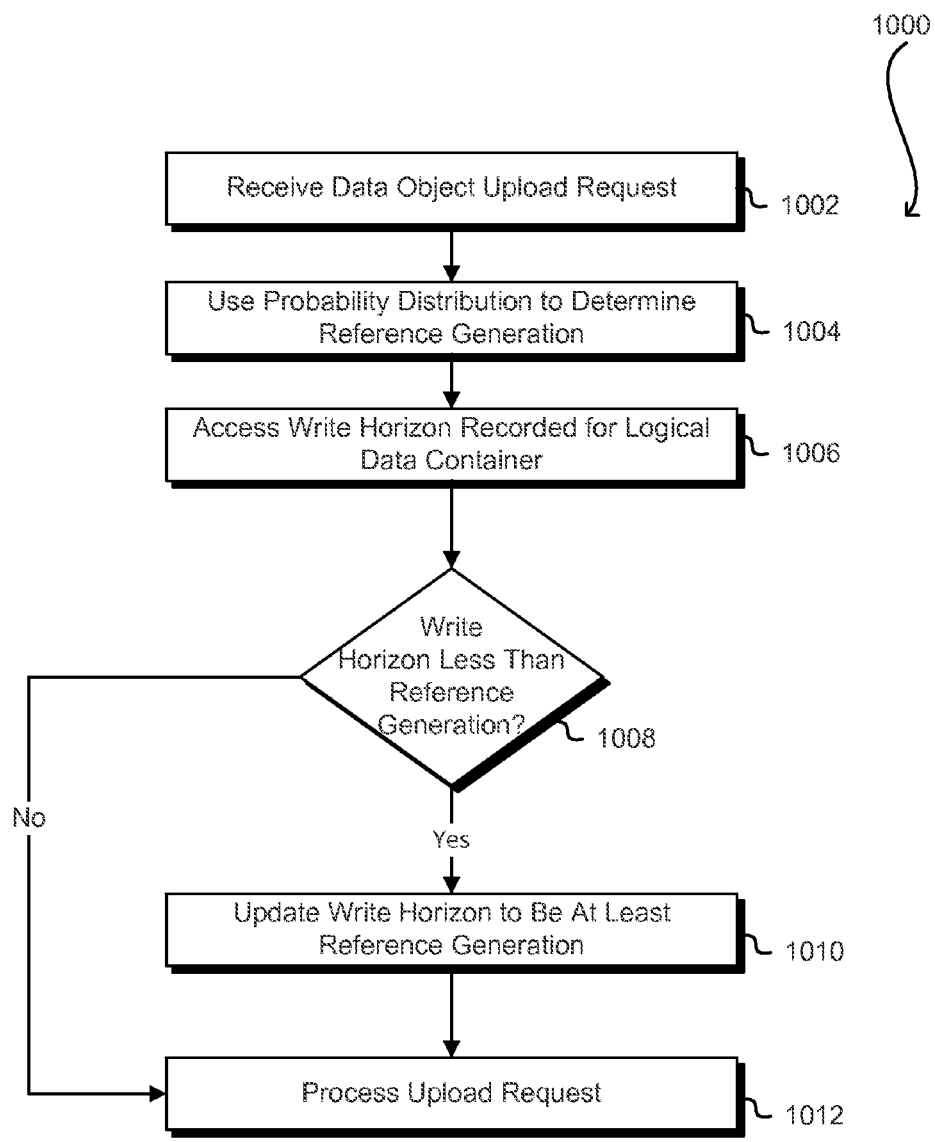
FIG. 10 illustrates an example process for updating write horizons, in accordance with at least one embodiment.

As discussed, numerous variations of the above techniques may be used in accordance with various embodiments. For example, a data storage system may receive numerous requests to add data to a logical data container during the processing of a particular generation, which may take several hours. For example, customers utilizing a data storage service may have automated processes that effectively continuously submit upload requests for the purpose of archival storage. Utilizing a write horizon, such as by using the process 800 discussed above, may only occur at relatively infrequent times, such as when the current generation changes since, after an update resulting from an upload request subsequent upload requests received before the current generation changes may not require an update to the write horizon. If a data storage system is receiving such frequent requests to add to a logical data container for numerous logical data containers (e.g., from multiple customers of the data storage system), a change in generation can cause a spike in the rate or writes to a database caused by write horizon updates. Accordingly, techniques of the present disclosure include variations that mitigate against such spikes and ensure system integrity. FIG. 10, for example, shows a process 1000 illustrating a technique for reducing spikes of the write rate of a database that stores write horizons for logical data containers.

As illustrated, the process 1000 includes receiving 1002 a data object upload request, such as described above in connection with FIG. 8. As a result of receiving 1002 the data object upload request, in an embodiment, the process 1000 includes using a probability distribution to determine 1004 a reference generation. Using the probability distribution to determine 1004 the reference generation may be performed by using a probability function whose output is used to determine how much to add to the current generation to compute the reference generation. In some embodiments, the output of the probability function has a range within the nonnegative integers and may be limited to a particular compact subset of the nonnegative integers. For example, the output of the probability function may be limited to the values of 0 and 1, or limited to the values of 0, 1, 2, or otherwise. For example, the probability distribution may be configured such that the amount added to the current generation is zero 99% of the time and one 1% of the time, although different percentages may be used. The probability distribution may also use more complicated probability distribution functions that determine the value of the increase amount so that, for example, the probability of the increase amount being a particular positive integer decreases with each successive integer and the probability may be zero for certain ranges of integers, such as all integers greater than two.

As illustrated, the process 1000 includes accessing 1006 the write horizon recorded for the logical data container associated with the data object upload request. The logical data container may be, for instance, a logical data container specified by the data object upload request so that, upon successful completion, the uploaded object will be contained by the specified logical data container. In various embodiments, process 1000 includes determining 1008 whether the write horizon is less than the reference generation. If determined 1008 that the write horizon is less than the reference generation, the process 1000 may include updating 1010 the write horizon to be at least the reference generation. For example, the write horizon may be updated 1010 to be the reference generation or a predetermined value above the reference generation. If it is determined 1008 that the write horizon is not less than the reference generation or after updating 1010 the write horizon, the process 1000 may include processing the upload request, such as described above.

The process 1000 may be performed numerous times as data object upload requests are received for the logical data container, and the process 1000 may be performed for other logical data containers maintained by a data storage system performing the process 1000.

As discussed, numerous variations are considered as being within the scope of the present disclosure. For example, the techniques discussed above for utilizing write horizons discuss specific embodiments for protecting against unintended deletion of data. As one possible variation, generation changes may occur on a predictable basis (e.g., every certain number of hours). A generation change may be anticipated and some or all updates to the metering database may be made prior to detection of the generation change, thereby causing writes to the metering database to be spread out over a longer time period. As another example, when generation changes are relatively predictable, a timer may be used to update write horizons. In some embodiments, write horizons are preemptively updated before a generation change for logical data containers that are frequently accessed. Whether a logical data container is frequently accessed may be defined in programming logic of a data storage system and may be defined based at least in part on number of upload requests per unit of time, based at least in part on frequency of upload requests relative to other logical data containers, based at least in part on observed customer behavior with respect to the logical data container and/or in other ways. Further, a probability distribution may be used to determine whether to preemptively update write horizons and/or by how much, such as described above. By updating write horizons for frequently accessed logical data containers, the write horizon is updated before a spike in writes caused by a generation change. Therefore, when a generation change occurs, fewer logical data containers will require a write horizon update at the next received upload request.

Figure 11:
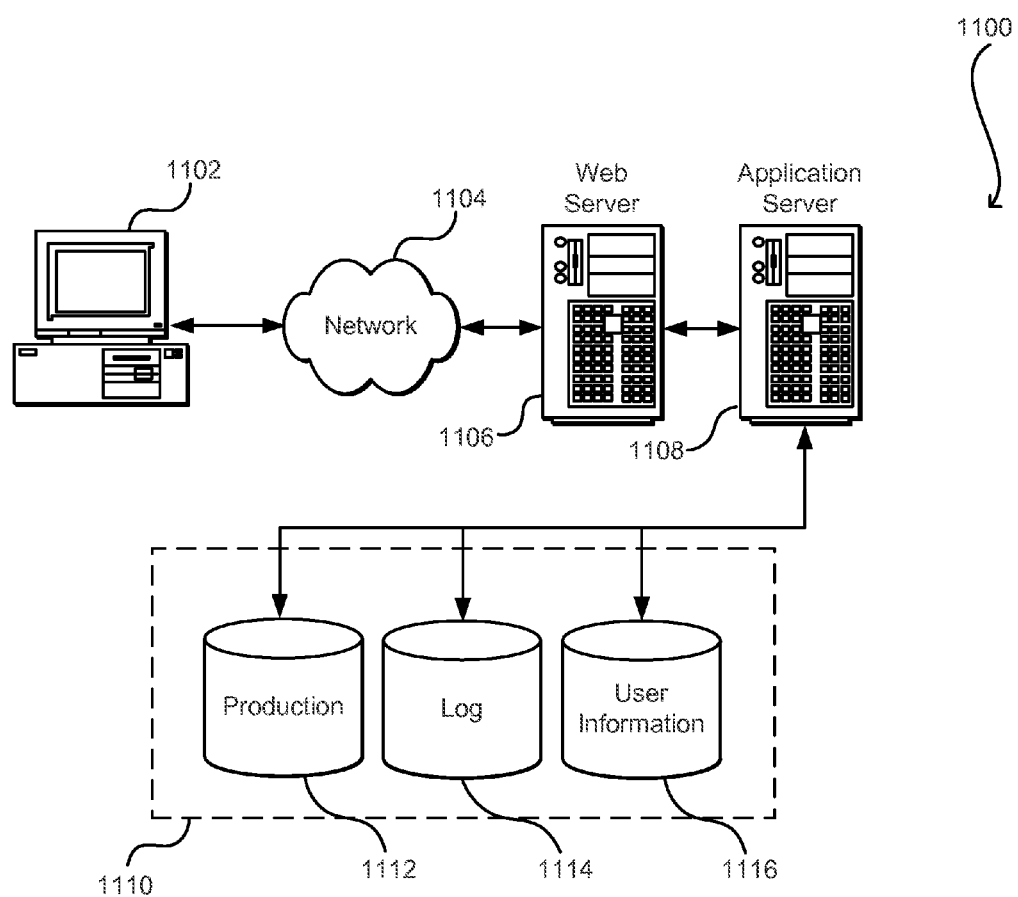
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the client device 1102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open Systems Interconnection ("OSI"), File Transfer Protocol ("FTP"), Universal Plug and Play ("UPnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium focal to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-only memory ("CD-ROM"), digital versatile disk ("DVD") or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context All references, including publications, patent applications and patents, cited herein are hereby incorporated by reference to the same extent as if each reference were individually and specifically indicated to be incorporated by reference and were set forth in its entirety herein.

What is claimed is:

1. A data storage system, comprising:
a backend system configured to:
   store, among a plurality of data storage devices, data for a plurality of logical data containers, at least some of the logical data containers containing one or more data objects;
   update, for at least a logical data container of the plurality of logical data containers, a value of a last processed generation for a generational count upon completion of a set of one or more data processing requests;
   update a value for a current generation of processing of one or more data processing requests;
a front end system configured to, for each logical data container of a plurality of logical data containers:
   maintain a write horizon value for the logical data container that is based at least in part on the updated value for the current generation;
   maintain a data object count representing a number of data objects in the logical data container; and
   reject requests to delete the logical data container as a result of either the data object count indicating a number of data objects in the logical data container greater than zero or the write horizon value being greater than the updated last processed generation.

2. The data storage system of claim 1, wherein the value of the last processed generation and the value of the current generation are updated for the plurality of logical data containers.

3. The data storage system of claim 1, wherein the set of one or more data processing requests includes data processing requests each for a different logical data container.

4. The data storage system of claim 1, wherein the front end system is further configured to, as a result of receiving a request to upload a data object to the logical data container, update the write horizon value to be at least a current value of the maintained generational count.

5. The data storage system of claim 1, wherein the front end system is further configured to, for each logical data container in a subset of the plurality of logical data containers, increase a corresponding write horizon value to be greater than the current generation.

6. The data storage system of claim 5, wherein increasing the corresponding write horizon value to be greater than the current generation is performed as a result of being within a predetermined amount of time of an anticipated update to the value for the current generation.

7. A computer-implemented method for managing data deletions, comprising:
under the control of one or more computer systems configured with executable instructions,
   processing generations of data processing requests in connection with collections of data;
   receiving a request to delete a logical data container;
   evaluating the request based at least in part on a value that indicates a possible existence of a pending request that can, upon completion of processing, result in the logical data container being nonempty, the value based at least in part on a count of the generations; and
   denying the request as a result of the value indicating the possible existence of the pending request.

8. The computer-implemented method of claim 7, wherein:
the method further comprises:
   receiving a request to add data to the logical data container; and
   as a result of receiving the request to add data to the logical data container, setting the value such that, for at least a period of time, the value indicates pendency of the request to add data to the logical data container; and
evaluating the request is based at least in part on the set value.

9. The computer-implemented method of claim 8, wherein the count of the generations comprises a current generational count for the generations, and wherein setting the set value is based at least in part on the current generational count.

10. The computer-implemented method of claim 9, wherein:
setting the value includes determining the value based at least in part on a probability distribution; and
the probability distribution is such that the determined value has a nonzero probability of being greater than the current generational count.

11. The computer-implemented method of claim 8, wherein setting the value includes determining the value based at least in part on a probability distribution.

12. The computer-implemented method of claim 8, wherein:

the method further comprises causing the request to add data to the logical data container to be processed asynchronously relative to the request to add data to the logical data container; and the period of time is sufficient to indicate the pendency until adding the data to the logical data container is complete.

13. The computer-implemented method of claim 7, wherein the process further comprises:

setting the value as a result of receiving a request that can, upon completion of processing, result in the logical data container being nonempty; and maintaining the value for a period of time after completion of processing of the received request.

14. The computer implemented method of claim 7, further comprising:

causing the request to be processed as a result of the value indicating the inexistence of a pending request that can, upon completion, result in the logical data container being nonempty.

15. A system, comprising:

one or more processors; and memory, including executable instructions that, when executed by the one or more processors, cause the system to at least:

process generations of data processing requests in connection with collections of data;

receive a delete request to delete a collection of data;

enforce a set of conditions on the collection of data required before the delete request is successfully processed, the set of conditions including:

a first condition on a size of the collection of data; and a second condition that any pending other request to perform an operation on the collection of data is unable to result in violation of the first condition before successful completion of the delete request, the second condition based at least in part on a count of the generations.

16. The system of claim 15, wherein the collection of data is a logical data container from a plurality of logical data containers, at least some of which contain one or more data objects.

17. The system of claim 15, wherein the condition on a size of the collection of data is based at least in part on a number of data objects in the collection, the data objects capable of having differing amounts of information.

18. The system of claim 15, wherein the condition on the size of the collection is that the collection be empty.

19. The system of claim 15, wherein enforcing the second condition includes checking a value that indicates whether there is a possibility of an uncompleted request causing violation of the first condition.

20. The system of claim 19, wherein the value is based at least in part on completion of a set of data processing requests processed by the system.

21. One or more non-transitory computer-readable storage media having collectively stored thereon instructions that, when executed by one or more processors of a computer system, cause the computer system to at least:

process generations of data processing requests in connection with collections of data;

receive a delete request for a collection of data;

access a first value that indicates whether a second value is current, the first value based at least in part on a count of the generations;

process the delete request such that successful completion of the delete request resulting in deletion of the collection of data requires a condition on the second value to be fulfilled and the first value to indicate that the second value is current.

22. The one or more non-transitory computer-readable storage media of claim 21, wherein the second value indicates a size of the collection of data.

23. The one or more non-transitory computer-readable storage media of claim 21, wherein the size is based at least in part on a number of data objects in the collection, the data objects not necessarily having uniform amounts of information.

24. The one or more non-transitory computer-readable storage media of claim 21, wherein the first value indicates, at least for a period of time, a possible pending data operation that, upon completion, can change the second value.

25. The one or more non-transitory computer-readable storage media of claim 21, wherein:

the condition on the second value is that the second value indicates that the collection of data is empty.

26. The one or more non-transitory computer-readable storage media of claim 21, wherein:

the instructions, when executed by the one or more processors, further cause the computer system to, as a result of a received request to add to the collection of data, update the first value in a manner reducing a probability that the first value will require updating as a result of another request being received after an update to the generational counter.

* * * * *